United States Patent
Osanai et al.

(10) Patent No.: US 10,044,898 B2
(45) Date of Patent: Aug. 7, 2018

(54) IMAGE READING DEVICE AND IMAGE FORMING APPARATUS INCORPORATING THE IMAGE READING DEVICE

(71) Applicants: Yohei Osanai, Kanagawa (JP); Yasunobu Youda, Kanagawa (JP); Masatoshi Ishida, Kanagawa (JP); Tatsuaki Nagano, Kanagawa (JP); Daisuke Imaki, Tokyo (JP); Satoshi Narai, Kanagawa (JP); Toshiyuki Horikawa, Kanagawa (JP); Takuji Kawai, Kanagawa (JP)

(72) Inventors: Yohei Osanai, Kanagawa (JP); Yasunobu Youda, Kanagawa (JP); Masatoshi Ishida, Kanagawa (JP); Tatsuaki Nagano, Kanagawa (JP); Daisuke Imaki, Tokyo (JP); Satoshi Narai, Kanagawa (JP); Toshiyuki Horikawa, Kanagawa (JP); Takuji Kawai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/461,873

(22) Filed: Mar. 17, 2017

(65) Prior Publication Data
US 2017/0331970 A1    Nov. 16, 2017

(30) Foreign Application Priority Data
May 10, 2016 (JP) .................. 2016-094313

(51) Int. Cl.
*H04N 1/04* (2006.01)
*H04N 1/10* (2006.01)
*H04N 1/00* (2006.01)

(52) U.S. Cl.
CPC .......... *H04N 1/1008* (2013.01); *H04N 1/0032* (2013.01); *H04N 1/1065* (2013.01); *H04N 2201/0094* (2013.01)

(58) Field of Classification Search
CPC ........ G03F 9/7088; G03F 9/70; G03F 9/7049; G03F 9/7069; G03F 7/70291;
(Continued)

(56) References Cited

U.S. PATENT DOCUMENTS 5,579,138 A * 11/1996 Sannohe ............. G02B 27/283
                                                      348/E9.027
6,553,155 B1 * 4/2003 Imamura ............ G06K 7/10722
                                                      358/474
(Continued)

FOREIGN PATENT DOCUMENTS

| JP | 2002-320075 | 10/2002 |
| JP | 2014-003396 | 1/2014 |
| JP | 2014-003421 | 1/2014 |

OTHER PUBLICATIONS

U.S. Appl. No. 15/347,179, filed Nov. 9, 2016.
U.S. Appl. No. 15/347,932, filed Nov. 10, 2016.
U.S. Appl. No. 15/348,782, filed Nov. 10, 2016.

*Primary Examiner* — Negussie Worku
(74) *Attorney, Agent, or Firm* — Harness, Dickey & Pierce, P.L.C.

(57) ABSTRACT

An image reading device, which is included in an image forming apparatus, includes a first transparent body, a second transparent body, a holding body, and a reading body. The second transparent body is disposed separated from and inclined at a predetermined angle to the first transparent body. The holding body holds the first and second transparent bodies. The reading body moves in a sub-scanning direction along the first and second transparent bodies. The holding body includes a flat face and a frame-shaped face.

(Continued)

Δl: AMOUNT OF CHANGE OF OPTICAL PATH LENGTH
n: REFRACTIVE INDEX
t: THICKNESS OF OBJECT HAVING REFRACTIVE INDEX n

The flat face is contiguous to the first transparent body on a same plane and smoothly connected with the second transparent body. The frame-shaped face projects outwardly beyond the second transparent body facing the reading body. The reading body moves and contacts the first transparent body and the holding body, and moves with a gap relative to the second transparent body.

13 Claims, 11 Drawing Sheets

(58) Field of Classification Search
CPC .............. G03F 7/70358; G03F 7/2002; G03F 7/70283; G03F 7/7035; G03F 7/70408; G03F 9/00; G03F 9/7038; B65H 5/004; B65H 9/04; G02F 1/21; G02F 1/29; G02F 1/31
USPC ....... 358/474, 498, 496, 497, 475, 408, 494, 358/1.12, 1.15, 1.16, 1.18, 300, 302, 401, 358/418, 472, 486, 487
See application file for complete search history.

(56) References Cited

U.S. PATENT DOCUMENTS

| | | | |
|---|---|---|---|
| 6,684,044 B2* | 1/2004 | Hayashi | H04N 1/02815 399/220 |
| 6,778,324 B1* | 8/2004 | Kato | G02B 23/14 359/431 |
| 8,072,655 B2* | 12/2011 | Park | H04N 1/121 358/474 |
| 2013/0335790 A1* | 12/2013 | Narai | H04N 1/0249 358/497 |
| 2016/0127590 A1 | 5/2016 | Hatayama et al. | |
| 2016/0277624 A1 | 9/2016 | Osanai et al. | |
| 2016/0360073 A1 | 12/2016 | Hatayama et al. | |
| 2016/0368728 A1 | 12/2016 | Hirata et al. | |
| 2017/0142265 A1* | 5/2017 | Horikawa | H04N 1/0057 |
| 2017/0183181 A1* | 6/2017 | Tada | B65H 3/0676 |
| 2017/0208208 A1* | 7/2017 | Fujii | H04N 1/3878 |

* cited by examiner

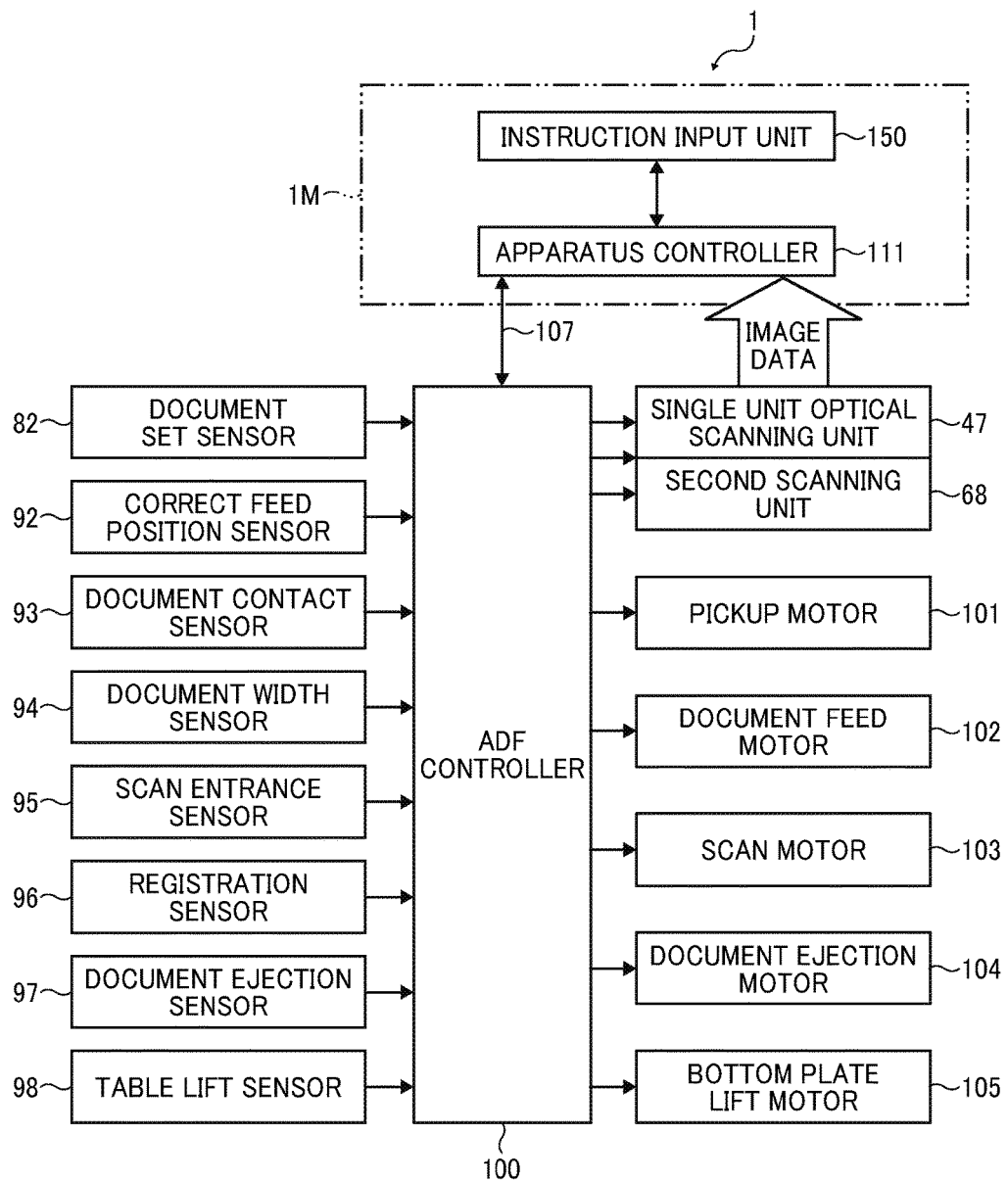

Δl: AMOUNT OF CHANGE OF OPTICAL PATH LENGTH
n: REFRACTIVE INDEX
t: THICKNESS OF OBJECT HAVING REFRACTIVE INDEX n

IMAGE READING DEVICE AND IMAGE FORMING APPARATUS INCORPORATING THE IMAGE READING DEVICE

CROSS-REFERENCE TO RELATED APPLICATION

This patent application is based on and claims priority pursuant to 35 U.S.C. § 119(a) to Japanese Patent Application No. 2016-094313, filed on May 10, 2016, in the Japan Patent Office, the entire disclosure of which is hereby incorporated by reference herein.

BACKGROUND

Technical Field

This disclosure relates to an image reading device that moves an image reading body between a first transparent member and a second transparent member having an inclination relative to the first transparent member to read an image formed on an original document, and an image forming apparatus that includes the image reading device and corresponds to a multifunction printer (MFP) including at least two functions of a copier, facsimile machine, printer, and printing machine.

Related Art

The needs of customers and users of image forming apparatuses such as multifunction printers (MFPs) have been growing diversified. In order to meet the needs, various types of original documents that can be used in an automatic document feeder (ADF) of an image forming apparatus have been developed, and such diversification has been spread to an image reading mechanism in an image scanner (SCN).

As an example, a known image forming apparatus includes a fixed reading function in which a moving image reading body reads an image formed on a stationary original document that is placed on a flatbed (FB) exposure glass and a sheet through reading function in which an image reading body reads an image formed on an original document while the original document is passing over a DF exposure glass.

A known image forming apparatus employing both the fixed reading function and the sheet through reading function includes a bridge that has a mountain-like sliding surface projecting downwardly toward a portion between a glass for stationary original document and a glass for automatic image reading.

In the known image forming apparatus, when a scanner unit reciprocally moves below the glass for stationary original document and the glass for automatic image reading, a sliding member contacts and slides the sliding surface of the bridge. This movement of the sliding member can prevent the scanner unit and the sliding member from contacting steps respectively formed between the glass for stationary original document, a resin member, and the glass for automatic image reading. Accordingly, the scanner unit can be prevented from being damaged and the resin member can be prevented from being worn.

The above-described known image forming apparatus employs a technique in which the bridge connects the glass for automatic image reading (e.g., a first transparent member) and the glass for stationary original document (e.g., a second transparent member) when both of which are on the same plane. In other words, the above-described technique is not applicable to an image reading device having the first transparent member and the second transparent member inclined to the first transparent member.

A known image reading device provided with the first transparent member and the second transparent member inclined to the first transparent member generally includes a contact image sensor (CIS) as an image reading body. Therefore, the known image reading device may further employ a curved glass disposed between the first transparent member and the second transparent member. Instead of employing costly curved glasses, the known image reading device employs a flat glass holding member disposed between the first transparent member and the second transparent member to hold these transparent members.

In the known image reading device having the above-described configuration, angles of the image reading body greatly change at a border of the first transparent member and the glass holding member and a border of the glass holding member and the second transparent member. As a result, malfunction of the known image reading device easily causes due to noise and mechanical impact. Further, while the image reading body of the image reading device is moving, the sliding member of the image reading body contacts the steps or edges of the above-described two borders, which results in abrasion of the sliding member. However, if a curved glass is employed, the manufacturing cost increases.

SUMMARY

At least one aspect of this disclosure provides an image reading device including a first transparent body, a second transparent body, a holding body, and a reading body. An original document is loaded on the first transparent body. The second transparent body is disposed separated from the first transparent body by a predetermined distance in a sub-scanning direction and is configured to incline at a predetermined angle relative to the first transparent body. The holding body is configured to hold the first transparent body and the second transparent body. The reading body is configured to move in the sub-scanning direction along the first transparent body and the second transparent body. The holding body includes a flat face and a frame-shaped face. The flat face is configured to close a distance between the first transparent body and the second transparent body and to be connected contiguous to the first transparent body on a same plane with a face of the first transparent body to which the reading body contacts. The frame-shaped face is configured to hold each of four side end portions of the second transparent body and project outwardly toward the reading body beyond a facing side of the second transparent body facing the reading body. A part of the second transparent body close to the first transparent body is smoothly connected with the flat face. The reading body is configured to move while closely contacting the first transparent body, contact with the holding body, and move with a gap relative to the second transparent body.

Further, at least one aspect of this disclosure provides an image forming apparatus including the above-described image reading device and an image forming device configured to form an image based on image data read by the image reading device.

BRIEF DESCRIPTION OF THE SEVERAL VIEWS OF THE DRAWINGS

FIG. 9 is a block diagram illustrating a control part of the image forming apparatus according to according to an embodiment of this disclosure;

DETAILED DESCRIPTION

Figure 1:
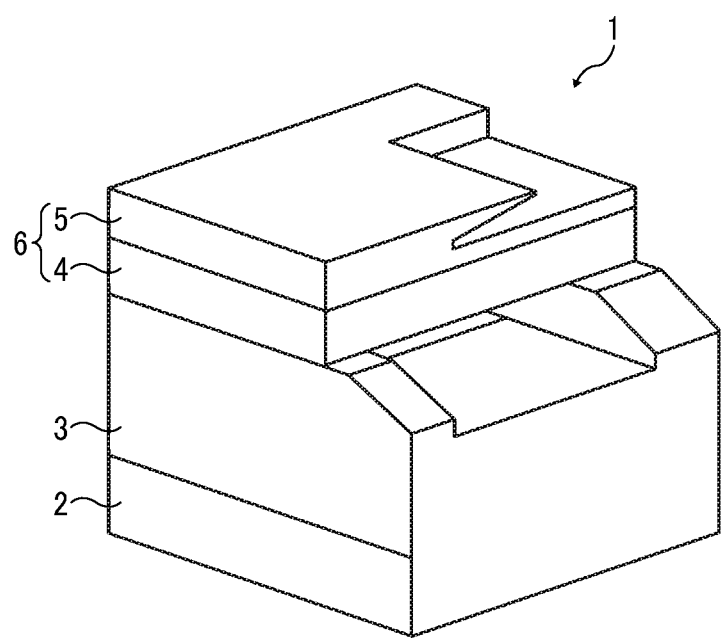
FIG. 1 is a perspective view illustrating a schematic configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Descriptions are given of an example applicable to an image reading device and an image forming apparatus incorporating the image reading device, with reference to the following figures.

Figure 2:
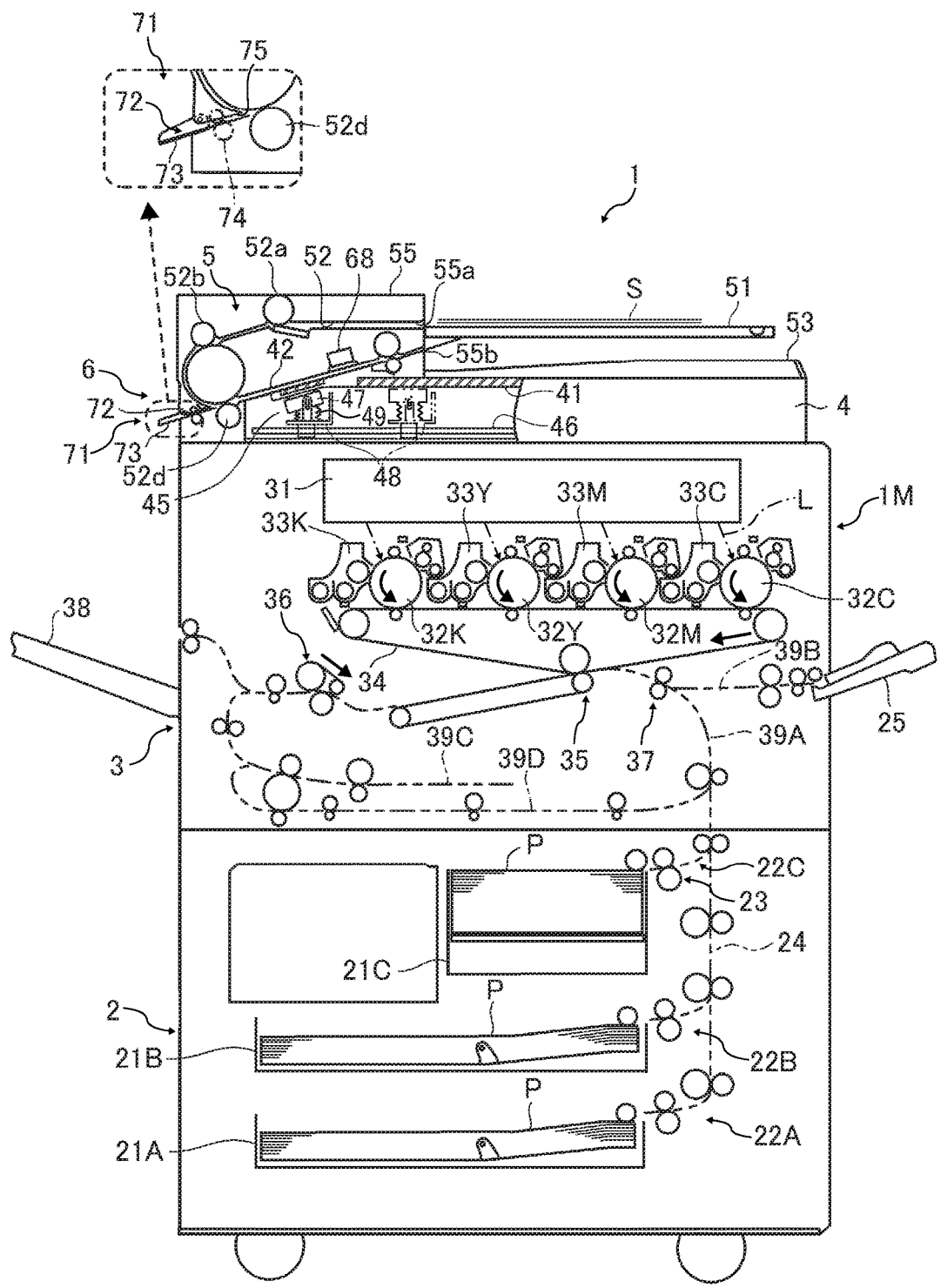
FIG. 2 is a cross sectional front view illustrating the schematic configuration of the image forming apparatus according to an embodiment of this disclosure.

FIG. 1 is a perspective view illustrating a schematic configuration of an image forming apparatus 1 according to an embodiment of this disclosure. FIG. 2 is a cross sectional front view illustrating the schematic configuration of the image forming apparatus 1 according to an embodiment of this disclosure.

It is to be noted that identical parts are given identical reference numerals and redundant descriptions are summarized or omitted accordingly.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

As illustrated in FIGS. 1 and 2, an image forming apparatus 1 according to the present embodiment of this disclosure is a digital multifunction printer that includes a housing 1M and an automatic document feeder (ADF) 5 disposed on the housing 1M. The housing 1M includes a sheet feeding device 2, an image forming device 3, and an image scanner 4.

The image scanner 4 and the ADF 5 form an image reading device 6. In the present embodiment, the ADF 5 includes an original document tray 51 and an original document output tray 53. The ADF 5 feeds an original document or original documents loaded on the original document tray 51 one by one to a predetermined document reading position. Then, the original document is discharged to the original document output tray 53 that is disposed below the original document tray 51. Hereinafter, the original document is referred to as an "original document sheet S".

The sheet feeding device 2 includes multiple sheet trays 21A, 21B, and 21C. Each of the multiple sheet trays 21A, 21B, and 21C accommodates transfer sheets P as a bundle of transfer sheets loaded therein in layers, including a transfer sheet P (for example, white papers) as a cut sheet. The multiple sheet trays 21A, 21B, and 21C include the transfer sheets P therein either in a portrait orientation or in a landscape orientation. The size of accommodation space in each of the multiple sheet trays 21A, 21B, and 21C to contain the transfer sheets P to be used can be selected from multiple sheet sizes previously prepared in the image forming apparatus 1.

The sheet feeding device 2 includes multiple sheet feeding members 22A, 22B, and 22C, multiple rollers 23, and a sheet feeding passage 24. A selected one of the sheet feeding members 22A, 22B, and 22C picks up each uppermost transfer sheet P of the transfer sheets P stored in a selected one of the multiple sheet trays 21A, 21B, and 21C, one by one to separate from the other transfer sheets P and feed the picked transfer sheet P to the sheet feeding passage 24. The multiple rollers 23 convey the transfer sheet P fed by the selected one of the multiple sheet feeding members 22A, 22B, and 22C to a predetermined image forming position of the image forming device 3 via the sheet feeding passage 24 is defined by the multiple rollers 23.

The image forming device 3 includes an exposure device 31, photoconductor drums 32K, 32Y, 32M, and 32C, and developing devices 33K, 33Y, 33M, and 33C. The developing devices 33K, 33Y, 33M, and 33C include black (K), yellow (Y), magenta (M), and cyan (C) color toners filled therein, respectively. The image forming device 3 further includes a primary transfer unit 34, a secondary transfer unit 35, and a fixing device 36.

The exposure device 31 generates a laser light beam L corresponding to each color of the black (K), yellow (Y), magenta (M), and cyan (C) color toners based on the image read by the image reading device 6, for example. The exposure device 31 emits the laser light beam L to irradiate the photoconductor drums 32K, 32Y, 32M, and 32C. By so doing, respective electrostatic latent images corresponding to the black (K), yellow (Y), magenta (M), and cyan (C) color toners are formed on respective surfaces of the photoconductor drums 32K, 32Y, 32M, and 32C corresponding to the images read by the image reading device 6.

The developing devices 33K, 33Y, 33M, and 33C are disposed closely facing the photoconductor drums 32K, 32Y, 32M, and 32C, respectively, so as to supply respective color toners to the photoconductor drums 32K, 32Y, 32M, and 32C to form a thin layer from the close positions. By so doing, the electrostatic latent image is developed into visible toner images.

The image forming device 3 primarily transfers the visible toner images formed on the respective surfaces of the photoconductor drums 32K, 32Y, 32M, and 32C sequentially into a composite four color toner image onto the primary transfer unit 34 in respective primary transfer nip regions. Thereafter, the secondary transfer unit 35 of the image forming device 3 disposed adjacent to the primary transfer unit 34 secondarily transfers the composite four color toner image onto the transfer sheet P in a secondary transfer nip region. The image forming device 3 conveys the toner image formed on the transfer sheet P is fused in the fixing device 36 by application of heat and pressure, so that the composite color image is fixed to the transfer sheet P.

The image forming device 3 further includes a sheet conveying passage 39A, a bypass tray 25, a bypass tray sheet feeding passage 39B, a switchback sheet conveying passage 39C, and a sheet reversing passage 39D. The transfer sheet P that has been conveyed from the sheet feeding device 2 via the sheet feeding passage 24 is further conveyed through the sheet conveying passage 39A toward the secondary transfer unit 35. In the sheet conveying passage 39A, the pair of registration rollers 37 adjusts the conveying timing and speed of the transfer sheet P. Then, in synchronization with the belt speeds at the primary transfer unit 34 and the secondary transfer unit 35, the transfer sheet P passes the secondary transfer unit 35 and the fixing device 36, and then is discharged to a sheet output tray 38.

The bypass tray sheet feeding passage 39B of the image forming device 3 feeds the transfer sheet P placed on the bypass tray 25 to the sheet conveying passage 39A at a position upstream from the pair of registration rollers 37 in a sheet conveying direction.

The switchback sheet conveying passage 39C and the sheet reversing passage 39D are located below the secondary transfer unit 35 and the fixing device 36. The switchback sheet conveying passage 39C and the sheet reversing passage 39D are defined by multiple sheet conveying rollers and multiple sheet conveying guides.

In duplex printing in which images are formed on both surfaces of a transfer sheet P, after the transfer sheet P having a fixed image on a front surface (a first surface) thereof has entered from one end of the switchback sheet conveying passage 39C, the switchback sheet conveying passage 39C performs switchback conveyance to retreat, in other words, move in an opposite direction to the direction the transfer sheet P is conveyed at the entry.

After completion of the switchback conveyance of the transfer sheet P in the switchback sheet conveying passage 39C, the front surface and a back surface (a second surface) of the transfer sheet P are reversed in the sheet reversing passage 39D, so that the transfer sheet P is ready to be fed to the pair of registration rollers 37 again.

After the image fixing operation to the image on the front surface of the transfer sheet P is performed in the switchback sheet conveying passage 39C and the sheet reversing passage 39D, the sheet conveying direction of the transfer sheet P is switched in the switchback sheet conveying passage 39C, and then the front surface and a back surface (a second surface) of the transfer sheet P is turned upside down. Thereafter, the transfer sheet P is ready to be conveyed to the pair of registration rollers 37 again. After the secondary transfer operation of the image and the image fixing operation to the back surface of the transfer sheet P are finished, the transfer sheet P is discharged to the sheet output tray 38.

Based on image data read by the image reading device 6 or print data to be transmitted from an external device such as a personal computer (PC), the image forming device 3 having the above-described configuration exposes the photoconductor drums 32K, 32Y, 32M, and 32C by the exposure device 31, for example, to form respective electrostatic latent images on the surfaces of the photoconductor drums 32K, 32Y, 32M, and 32C. Then, the developing devices 33K, 33Y, 33M, and 33C supply toners of respective colors onto the respective electrostatic latent images on the photoconductor drums 32K, 32Y, 32M, and 32C. Further, the image forming device 3 causes the visible toner image formed on the photoconductor drums 32K, 32Y, 32M, and 32C to be primarily transferred onto the transfer belt in the primary transfer unit 34. Then, the toner image is secondarily transferred onto the transfer sheet P by overlaying the respective images in the secondary transfer unit 35. Thereafter, the fixing device 36 fixes the toner image to the transfer sheet P by application of heat and pressure to form a color image.

Now, a description is given of operations of the image reading device 6 that includes the ADF 5 and the image scanner 4.

The image reading device 6 performs an image reading operation by switching between a DF scanner mode and a flatbed scanner mode. The DF scanner mode is a mobile original document reading mode that employs a sheet through method in which an image formed on a mobile original document sheet S (including a small size original document sheet such as a postcard side original document sheet) is read while the mobile original document sheet is being conveyed automatically by the ADF 5. The flatbed scanner mode is a stationary original document reading mode in which a stationary original document sheet is set on a flat exposure glass (i.e., a flatbed exposure glass 41) to read an image formed on the stationary original document sheet after the ADF 5 is closed.

In the flatbed scanner mode, the image scanner 4 emits light to the image side of the original document sheet S (for example, an original document, a thick paper, and a book) placed on the flatbed exposure glass 41. Then, the image scanner 4 converts the reflection light reflected on the image side of the original document sheet S to an image signal. By so doing, the image formed on the original document sheet S can be read.

In the DF scanner mode, the ADF 5 separates the original document sheet S one by one from the bundle of original document sheets S loaded on the original document tray 51 and conveys the original document sheet S via a document inlet port 55a. The document inlet port 55a functions as a first sheet feeding port disposed at one end of the original document tray 51. Then, the original document sheet S is conveyed along a U-turn conveyance passage 56. The U-turn conveyance passage 56 functions as a first sheet conveying passage constructed by a mechanism of a first original document conveying passage 52. As the original document sheet S is conveyed in a document conveying direction, the leading end thereof first comes to the downstream side of the document conveying direction. While being conveyed, the original document sheet S is brought to face the DF exposure glass 42. That is, the original document sheet S passes sequentially from the leading end to the trailing end over the upper face side of the DF exposure glass 42 that is a predetermined document reading position of the image scanner 4. Specifically, the image reading device 6 sequentially reads the image of the original document sheet S conveyed by the ADF 5 on the DF exposure glass 42 of the image scanner 4. By so doing, the DF scanner function can be effectively performed.

Figure 3:
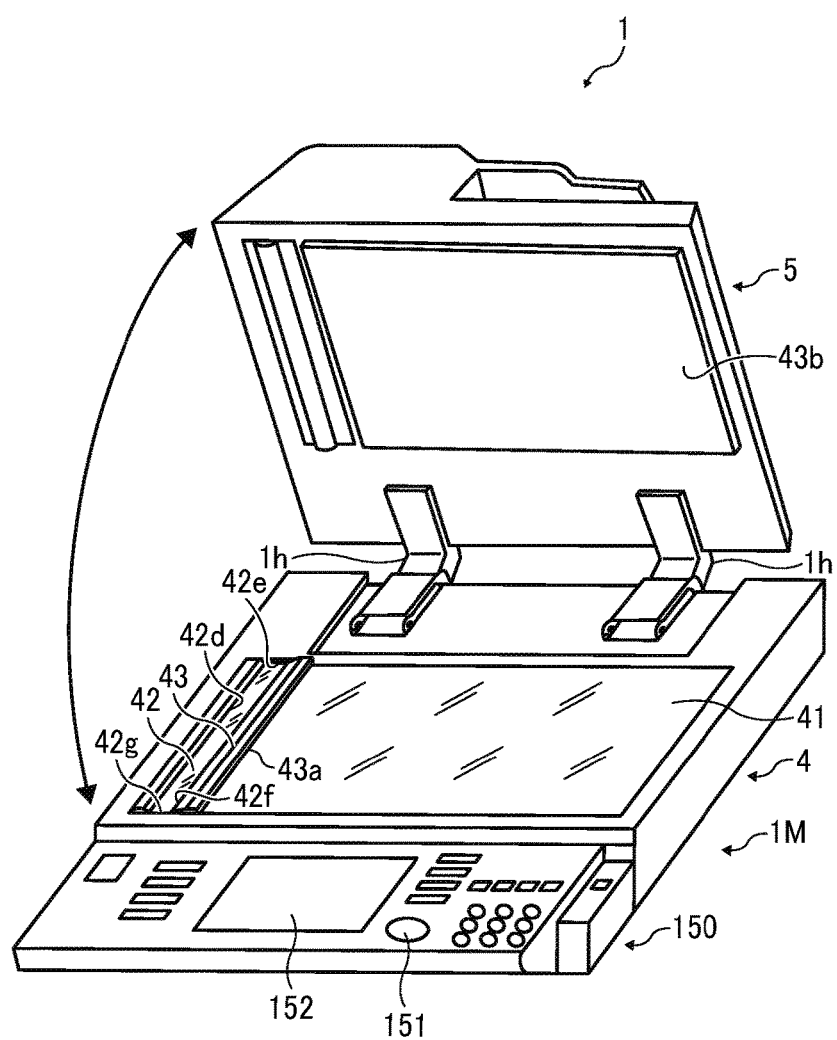
FIG. 3 is a perspective view illustrating a configuration of an apparatus body of the image forming apparatus according to an embodiment of this disclosure and an automatic document feeder coupled by hinge to the apparatus body.

FIG. 3 is a perspective view illustrating a configuration of the housing 1M of the image forming apparatus 1 according to an embodiment of this disclosure and the ADF 5 coupled by hinges 1h to the housing 1M.

As illustrated in FIG. 3, the ADF 5 is attached to a rear part (a back side) of an upper face side of the housing 1M via an opening and closing mechanism such as the hinges 1h.

Consequently, the ADF 5 moves between an open position at which the flatbed exposure glass 41 is open to the housing 1M and a closed position at which the ADF 5 presses an original document sheet S placed on the flatbed exposure glass 41.

Further, as illustrated in FIG. 3, the image scanner 4 is mounted on the housing 1M of the image forming apparatus 1. The image scanner 4 includes the DF exposure glass 42, the flatbed exposure glass 41, and a contact member 43a. The DF exposure glass 42 is located in the sheet conveying passage of the original document sheet S. The flatbed exposure glass 41 loads the original document sheet S thereon. The contact member 43a contacts one edge of the original document sheet S and positions the original document sheet S.

Further, the housing 1M includes an instruction input unit 150 on an upper front side of the image forming apparatus 1.

The instruction input unit 150 includes a print key 151 and a touch panel 152. As the print key 151 is pressed down, a copy start signal or a data transmission start signal is issued to the image forming apparatus 1.

The ADF 5 is coupled with the upper part of the housing 1M of the image forming apparatus 1 openably and closably via the hinges 1h. An original document cover 43b is attached to a lower surface of the ADF 5. As previously described, the ADF 5 can be rotated or turned between the open position at which the DF exposure glass 42 and the flatbed exposure glass 41 of the image scanner 4 are exposed and a closed position at which the DF exposure glass 42 and the flatbed exposure glass 41 of the image scanner 4 are covered.

Figure 4:
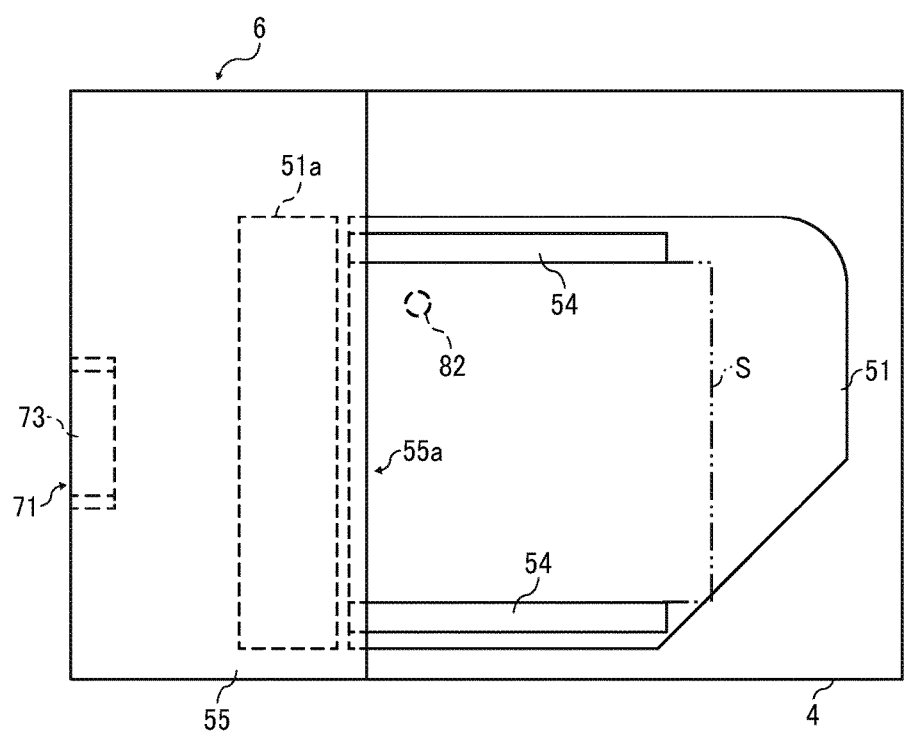
FIG. 4 is a top view illustrating a document sheet tray included in the image forming apparatus according to an embodiment of this disclosure.

As illustrated in FIG. 4, the document sheet tray 51 is provided with a pair of side guide plates 54. The pair of side guide plates 54 are movable pair of right and left guide plates to position the original document sheet S set in the ADF 5 in a sheet width direction perpendicular to the document conveying direction of the original document sheet S. The pair of side guide plates 54 functions as a pair of guide plates disposed relatively separatable and closable to each other in the width direction of the document sheet tray 51 so as to match the document sheet tray 51 and a reference position in the width direction of the original document sheet S. However, the function of the pair of side guide plates 54 is not limited thereto. For example, one plate of the pair of side guide plates 54 may be disposed fixedly on the document sheet tray 51. In this case, one end of the original document sheet S is contacted to one end of the fixed plate of the side guide plates 54 and a movable plate of the pair of the side guide plates 54 moves to contact the opposite end of the original document sheet S.

A document set sensor 82 is disposed in the vicinity of the bottom plate of the leading end side (the downstream side) of the document sheet tray 51. The document set sensor 82 detects whether or not the original document sheet S is placed on the document sheet tray 51.

A cover 55 is disposed openably closable to cover at least an upward side of the ADF 5. The cover 55 includes the document inlet port 55a that is disposed at an upper part of a feeding side end portion of the document sheet tray 51 so as to guide the leading edge of the original document sheet S into an inside of the cover 55. The cover 55 also covers an upper part of the leading end side of the document sheet tray 51 so that the leading end side of the document sheet tray 51 is positioned inside or downstream from the document inlet port 55a in the document conveying direction. The ADF 5 defines the first original document conveying passage 52 extending from the document inlet port 55a to a document outlet port 55b that is disposed above the original document output tray 53. The main guide part that forms the first original document conveying passage 52 is defined by a rib formed by the cover 55.

Figure 5:
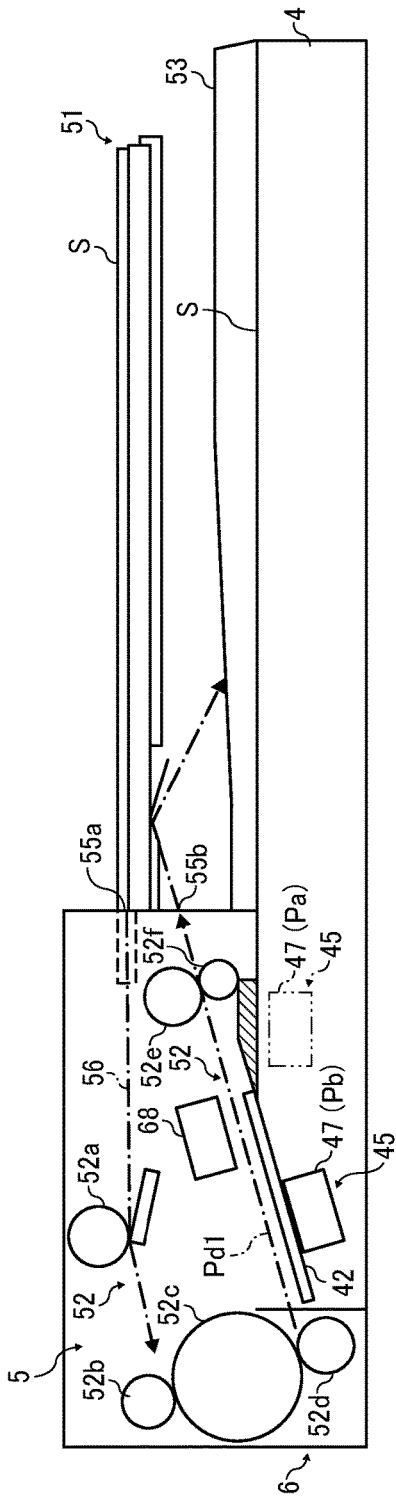
FIG. 5 is a diagram illustrating a U-turn conveyance passage in an image reading device according to an embodiment of this disclosure.
Figure 6:
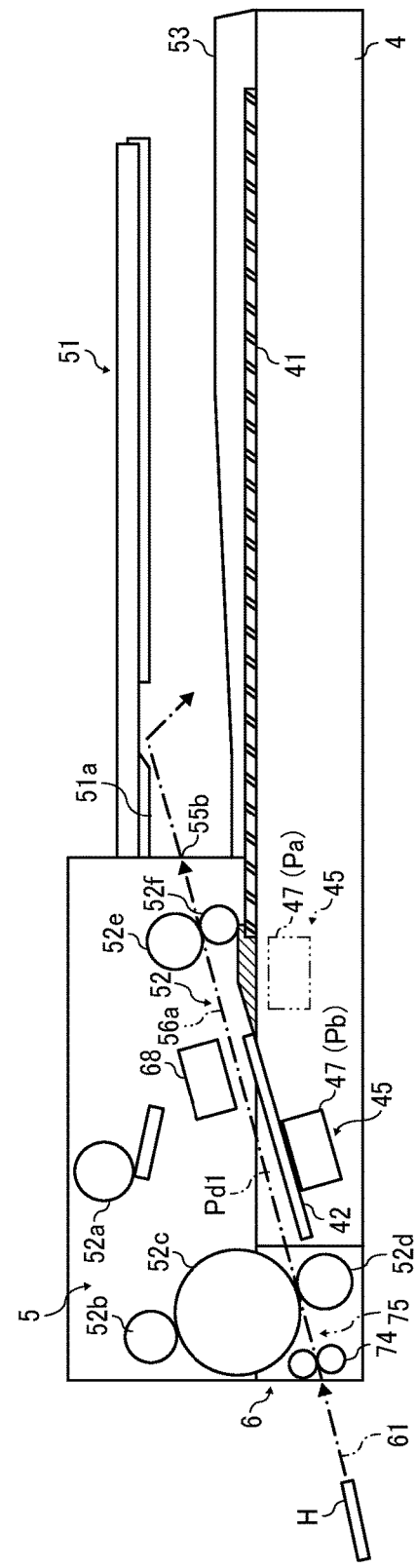
FIG. 6 is a diagram illustrating a straight conveyance passage in an image reading device according to an embodiment of this disclosure.

Next, a description is given of a configuration of the ADF 5 with reference to FIGS. 5 and 6.

FIG. 5 is a diagram illustrating the U-turn conveyance passage 56 in the image reading device 6 according to an embodiment of this disclosure. Specifically, FIG. 5 illustrates a mechanism in which the ADF 5 feeds the original document sheet S from the document sheet tray 51 through the U-turn conveyance passage 56.

As illustrated in FIG. 5, the ADF 5 includes the original document tray 51, the first original document conveying passage 52, and the original document output tray 53. The original document tray 51 functions as an original document loading table on which a standard size original document sheet S can be loaded. The first original document conveying passage 52 functions as a sheet conveying part in which an original document sheet S can be read during conveyance. The original document output tray 53 stacks the original document S after the image of the original document S is read. It is to be noted that, in order to achieve a reduction in size, the original document tray 51 and the original document output tray 53 are disposed vertically separated from each other with part of the original document tray 51 and the original document output tray 53 disposed vertically overlapping at least in a planar view.

The first original document conveying passage 52 includes a document separation unit 52a that separates an uppermost original document sheet S placed on a bundle of original document sheets S loaded on the original document tray 51 one by one and conveys the uppermost original document sheet S to the first original document conveying passage 52.

Multiple document conveying rollers 52b, 52c, and 52d are disposed in the first original document conveying passage 52 to turn the original document sheet S to change the direction of conveyance of the original document sheet S separated and conveyed to the first original document conveying passage 52. After having been turned, the original document sheet S is conveyed along the DF exposure glass 42 so as to cause the original document sheet S to pass by a predetermined scanning position Pd1 on a top face of the DF exposure glass 42.

The first original document conveying passage 52 further includes a pair of document output rollers 52e and 52f disposed downstream from the predetermined scanning position Pd1 in the document conveying direction. The U-turn conveyance passage 56 is a passage through which a mechanism of the first original document conveying passage 52 passes the original document sheet S.

It is to be noted that the number of rollers for sheet conveying and sheet discharging and the positions of these rollers can be freely determined according to setting conditions of the first original document conveying passage 52 and the length in the document conveying direction of the original document sheet S having the smallest size.

The first document scanning unit 45 includes the single unit optical scanning unit 47. Letter "Pa" in FIG. 5 indicates a home position of the single unit optical scanning unit 47. When the single unit optical scanning unit 47 is moved from the home position Pa (indicated with a broken line and letter "47 (Pa)") and then is located at a DF scanning position Pb as indicated by letter "47 (Pb)" in FIG. 5, that is, at a position indicated with a solid line in FIG. 2, the single unit optical scanning unit 47 of the first document scanning unit 45 repeatedly performs line scanning of an image on the original document sheet S at the scanning position Pd1. By so doing, the first document scanning unit 45 reads the image of the original document sheet S. After the image has been read, the original document sheet S is output onto the original document output tray 53 by the pair of document output rollers 52e and 52f.

As described above, the first original document conveying passage 52 includes the document separation unit 52a, the multiple document conveying rollers 52b, 52c, and 52d, and the pair of document output rollers 52e and 52f. In addition, the first original document conveying passage 52 includes a controller that controls conveyance of the original document sheet S based on the multiple sensors and the detection information. The multiple sensors include a correct feed position sensor 92, a document contact sensor 93, a document width sensor 94, a scan entrance sensor 95, a registration sensor 96, a document ejection sensor 97, and a table lift sensor 98, and so forth (FIG. 9) and these sensors are disposed from an upstream side to a downstream side in this order. Certainly, the regular original document sheet S corresponds to a plain paper copy (PPC) sheet or other easily bendable sheet having an image recordable side.

The first original document conveying passage 52 includes a straight conveyance passage 56a that functions as a second conveying passage. The straight conveyance passage 56a extends in an inclined manner along the DF exposure glass 42 in a predetermined conveyance section from a nip position of the document conveying rollers 52c and 52d disposed at the upstream side of the DF exposure glass 42 to the document outlet port 55b.

FIG. 6 is a diagram illustrating the straight conveyance passage 56a in the image reading device 6 according to an embodiment of this disclosure. Specifically, FIG. 6 illustrates a mechanism in which the original document sheet S is conveyed through the straight conveyance passage 56a in the ADF 5 from a document feeding port 72 (a second sheet feeding port) of a card supplying tray 73 (a bypass tray) illustrated in FIG. 7.

As illustrated in FIG. 6, the straight conveyance passage 56a is a sheet conveying passage through which a hard sheet having a flexural rigidity higher than a regular original document sheet is conveyed. Specifically, when an image formed on a hard sheet, such as a small-size hard sheet H, is read, the hard sheet H is inserted via the document feeding port 72 of the card supplying tray 73 functioning as a bypass tray and is conveyed along a plane inclined to be parallel to the upper face of the DF exposure glass 42. Further, the hard sheet H is designed to pass a predetermined scanning position Pd1 on the DF exposure glass 42 when being conveyed through the straight conveyance passage 56a.

Small-size hard sheets H may be standard size cards formed by resin (or thick paper) such as driving license cards, ID cards (identification cards), and travel cards. As illustrated in FIG. 5, the hard sheet H is an original document that is not bent and conveyed by the multiple document conveying rollers 52b, 52c, and 52d.

That is, the hard sheet H is not suitable for the U-turn conveyance passage 56 in which the original document sheet S is turned and reversed but is suitable for the straight conveyance passage 56a. A small-size card described herein corresponds to a card, for example, having a size of any one of ID-1, ID-2, and ID-3 of ISO/IEC7810 that is an international standard that regulates the shapes of an identification card or a card having the substantially same size as the above-described card. However, the width in the lateral direction of the small-side card is set to be smaller than the width in the lateral direction of the smallest size cut sheet of multiple standard cut sheet sizes that are settable on the original document tray 51.

The straight conveyance passage 56a is defined by the multiple document conveying rollers 52c and 52d and the pair of document output rollers 52e and 52f. Similarly, a second original document conveying passage 61 is formed and defined by the multiple document conveying rollers 52c and 52d, the pair of document output rollers 52e and 52f, and a controller that controls conveyance of original document sheets based on detection results obtained by the multiple sensors disposed on the straight conveyance passage 56a. Therefore, the second original document conveying passage 61 is a sheet conveying passage through which the small-size hard sheet H is conveyed. Specifically, when an image formed on the hard sheet H is read, the hard sheet H is inserted from the document feeding port 72 that is one end side of the straight conveyance passage 56a, is conveyed through the straight conveyance passage 56a, and is ejected from the document outlet port 55b that is the other end side of the straight conveyance passage 56a. The other end side of the straight conveyance passage 56a is located in an original document ejecting area.

Figure 7:
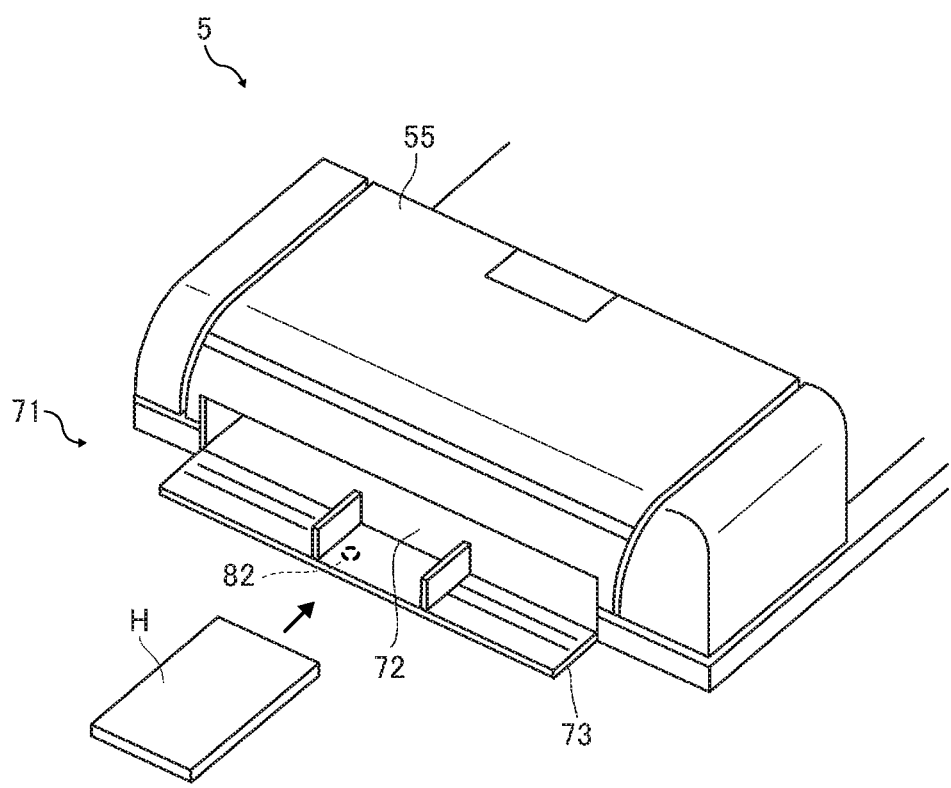
FIG. 7 is a diagram illustrating supply of a hard sheet into the image reading device according to an embodiment of this disclosure.
Figure 8A:
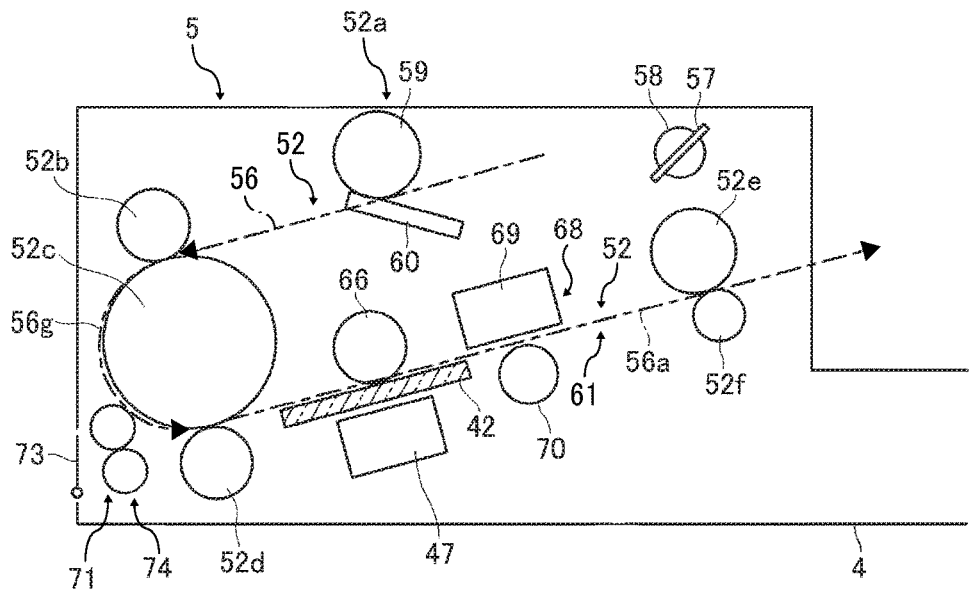
FIG. 8A is a diagram illustrating operations of the automatic document feeder in the image forming apparatus according to an embodiment of this disclosure.
Figure 8B:
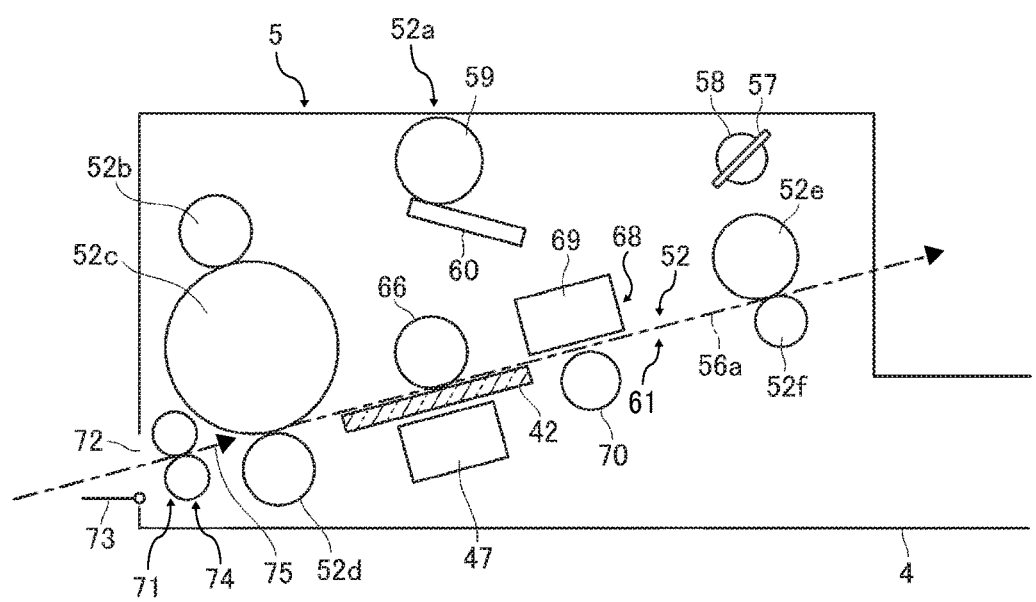
FIG. 8B is a diagram illustrating another operations of the automatic document feeder in the image forming apparatus according to an embodiment of this disclosure.

FIG. 7 is a diagram illustrating supply of the hard sheet H into the image reading device 6. FIG. 8A is a diagram illustrating operations of the ADF 5 in the image forming apparatus 1. FIG. 8B is a diagram illustrating another operations of the ADF 5 in the image forming apparatus 1.

As illustrated in FIG. 7, the card supplying portion 71 includes the document feeding port 72 that is formed on a side face of the ADF 5 and the card supplying tray 73. The card supplying portion 71 further includes a card pickup roller 74 and a card conveying passage 75 (see FIG. 8).

A document set sensor 82 is disposed in the vicinity of the bottom plate of the card supplying tray 73. The document set sensor 82 detects whether or not the original document sheet S, in this case, the hard sheet H is placed on the card supplying tray 73.

The card supplying tray 73 is generally in a closed state. In the closed state, the card supplying tray 73 functions as a part of a side face of the cover 55. As illustrated in FIGS. 7, 8A and 8B, the card supplying tray 73 is rotatably supported so that the document feeding port 72 can open. When the card supplying tray 73 is in the closed state, the card supplying tray 73 functions as part of a sheet transfer guide of the original document sheet S that is a regular original document.

When the small-size hard sheet H is set on the card supplying tray 73, the card pickup roller 74 picks up the hard sheet H and supplies the hard sheet H to the card conveying passage 75 via the document feeding port 72. The card conveying passage 75 is a document conveying passage that extends in a downwardly inclined manner from the document feeding port 72. The card conveying passage 75 merges the U-turn conveyance passage 56 at the upstream side of the DF exposure glass 42.

At this time, the card conveying passage 75 is arranged to have an angle of inclination along with the downward inclination of the DF exposure glass 42. That is, in a range of from the document feeding port 72 to the DF exposure glass 42, the card conveying passage 75 extends at the same angle of inclination of the DF exposure glass 42 to be on the same flat plane as the DF exposure glass 42. According to this configuration, the card conveying passage 75 and the straight conveyance passage 56a are located on the same plane along the angle of inclination of the DF exposure glass 42 over the whole range of from the document feeding port 72 to the document outlet port 55b. That is, the hard sheet H that is supplied from the card supplying tray 73 is conveyed along the card conveying passage 75 and the straight conveyance passage 56a.

As illustrated in detail in FIG. 8, the document conveying part 52 includes a set feeler 57 that is located at an upstream end of the document inlet port 55a in the document conveying direction of the original document sheet S, that is, at the upper part of the leading end of the original document tray 51. The set feeler 57 rotates along with loading of the original document sheet S. The first original document conveying passage 52 includes a pickup roller 58 and the document separation unit 52a. The pickup roller 58 is disposed inside from the document inlet port 55a. The document separation unit 52a includes a document feed roller 59 and a separation panel 60 disposed facing each other with the U-turn conveyance passage 56 interposed therebetween.

The pickup roller 58 picks up some original document sheets S (ideally, one original document sheet S) from top of a bundle of original document sheets S loaded on the original document tray 51 at a contact position.

The document feed roller 59 is rotatable in the document conveying direction. When multiple original document sheets S are to be fed, the separation panel 60 applies resistance to the original document sheets S other than the uppermost original document sheet S in a rotational direction of the document feed roller 59. By so doing, multifeed of the original document sheets S is prevented.

It is to be noted that the document feed roller 59 may be any other member such as a belt and a roller that rotates in a direction opposite the rotational direction of a sheet feed roller (or a sheet feed belt).

It is to be noted that the multiple document conveying rollers 52b, 52c, and 52d are disposed adjacent to each other downstream from the document feed roller 59 in the rotational direction of the document feed roller 59. The multiple document conveying rollers 52b, 52c, and 52d include a leading end alignment mechanism in which skew of the original document sheet S during the conveyance is corrected according to a drive timing of the pickup roller 58 by causing the leading end of the fed original document sheet S to be abutted against the multiple document conveying rollers 52b, 52c, and 52d before the original document sheet S is further conveyed.

The first original document conveying passage 52 includes a first scanning roller 66 and the pair of document output rollers 52e and 52f. The first scanning roller 66 is disposed facing the upward side of the DF exposure glass 42 to read an image formed on the original document sheet S. The pair of document output rollers 52e and 52f is disposed upstream from the document outlet port 55b in the document conveying direction to eject the original document sheet S from the document outlet port 55b toward the original document output tray 53.

The first scanning roller 66 is biased by a biasing member such as a coil spring toward the DF exposure glass 42. The first scanning roller 66 causes the original document sheet S to closely contact the DF exposure glass 42 while conveying the original document sheet S.

The first original document conveying passage 52 includes a second document scanning unit 68 that is disposed downstream from the first scanning roller 66 in the document conveying direction and between the multiple document conveying rollers 52b, 52c, and 52d and the pair of document output rollers 52e and 52f, along a passage where the original document sheet S is conveyed relatively linearly.

The second document scanning unit 68 includes a back surface scanning unit 69 and a second scanning roller 70. The back surface scanning unit 69 functions as a scanning unit to read an image formed on a back face of the original document sheet S or the hard sheet H. The second scanning roller 70 is disposed facing the back surface scanning unit 69 across the straight conveyance passage 56a.

The back surface scanning unit 69 uses a contact image sensor to read the image formed on the back face of the original document sheet S or the hard sheet H after the single unit optical scanning unit 47 of the image scanner 4 has read an image formed on a front face of the original document sheet S or the hard sheet H.

The second scanning roller 70 prevents lifting of the original document sheet S or the hard sheet H in the back surface scanning unit 69. At the same time, the second scanning roller 70 functions as a reference white to obtain shading data of the back surface scanning unit 69. It is to be noted that, when an image formed on the back face of the original document sheet S or the hard sheet H is not read, the original document sheet S or the hard sheet H passes through the back surface scanning unit 69 without stopping.

The second scanning roller 70 maintains an appropriate distance with the back surface scanning unit 69 with the aid of a gap adjusting mechanism by which a distance (a conveyance gap) between the back surface scanning unit 69 and the original document sheet S or the hard sheet H is appropriately adjusted to meet a focal depth that does not deteriorate image quality.

Next, a description is given of document reading operations in the ADF 5, with reference to FIGS. 5 through 8B.

In the above-described configuration, when an image formed on the original document sheet S is read, the bundle of original document sheets S is set on the original document tray 51 as illustrated in FIG. 5. As the print key 151 is pressed, the uppermost original document sheet S of the bundle of original document sheets S is firstly fed to the U-turn conveyance passage 56 via the document inlet port 55a. Then, the subsequent original document sheets S sequentially follow the uppermost original document sheet S.

Then, as illustrated in FIG. 8A, after the original document sheet S set on the original document tray 51 has been fed to the U-turn conveyance passage 56 via the document inlet port 55a, the original document sheet S is turned along a curved part 56g where the U-turn conveyance passage 56 is curved. Thereafter, when the original document sheet S passes over the upper face of the DF exposure glass 42, the first face (for example, the front face) of the original document sheet S is read by the single unit optical scanning unit 47 that functions as an image sensor while the original document sheet S is caused to closely contact with the DF exposure glass 42 by a pressing force applied by the first scanning roller 66.

Further, in a case in which the second face (for example, the back face) of the original document sheet S is read, when the original document sheet S passes the back surface scanning unit 69, the second face of the original document sheet S is read by the back surface scanning unit 69 while the original document sheet S is caused to closely contact with the back surface scanning unit 69 by a pressing force applied by the second scanning roller 70. After the image on the back face of the original document sheet S has been read, the original document sheet S is output onto the original document output tray 53 via the document outlet port 55b by the pair of document output rollers 52e and 52f.

By contrast, an image may be formed on a small original document sheet smaller than the smallest size original document sheet S (for example, a postcard size sheet) that is settable on the original document tray 51, specifically, the hard sheet H including a thick resin card such as a bank card and credit card. When such a small original document sheet such as the hard sheet H is read, the card supplying tray 73 is rotated to open the document feeding port 72, as illustrated in FIG. 7.

In this state, the hard sheet H or a bundle of hard sheets H is set on the card supplying tray 73. As the print key 151 is pressed, the uppermost hard sheet H of the bundle of hard sheets H is firstly fed to the card conveying passage 75 via the document feeding port 72. Then, the subsequent original document sheets S sequentially follow the uppermost hard sheet H. The card conveying passage 75 extends entirely on the same plane. At the same time, the card pickup roller 74, the first scanning roller 66, and the pair of document output rollers 52e and 52f are disposed at intervals equal to or smaller than a longitudinal size or a lateral size of the hard sheet H.

Then, as illustrated in FIG. 8B, when the hard sheet H that has been fed to the card conveying passage 75 via the document feeding port 72 passes over the upper face of the DF exposure glass 42, the first face of the hard sheet H is read by the single unit optical scanning unit 47 while the hard sheet H is caused to closely contact with the DF exposure glass 42 by a pressing force applied by the first scanning roller 66.

Further, in a case in which the second face (for example, the back face) of the hard sheet H is read, when the hard sheet H passes the back surface scanning unit 69, the second face of the hard sheet H is read by the back surface scanning unit 69 while the hard sheet H is caused to closely contact with the back surface scanning unit 69 by a pressing force applied by the second scanning roller 70. After the image on the back face of the hard sheet H has been read, the hard sheet H is output onto the original document output tray 53 via the document outlet port 55*b* by the pair of document output rollers 52*e* and 52*f*.

As described above, the image forming apparatus 1 according to an embodiment of this disclosure includes the original document tray 51, the document inlet port 55*a*, the first original document conveying passage 52, the single unit optical scanning unit 47, the back surface scanning unit 69, the document feeding port 72, and the straight conveyance passage 56*a*. The original document tray 51 loads the original document sheet S on which an image to be read is formed. The document inlet port 55*a* accepts the original document sheet S loaded on the original document tray 51. The first original document conveying passage 52 conveys the original document sheet S taken via the document inlet port 55*a* through the U-turn conveyance passage 56. The single unit optical scanning unit 47 is disposed in the first original document conveying passage 52 to read the image formed on the first face (the front face) of the original document sheet S while the original document sheet S is being conveyed. The back surface scanning unit 69 is disposed in the first original document conveying passage 52 to read the image formed on the second face (the back face) of the original document sheet S while the original document sheet S is being conveyed. The document feeding port 72 is disposed separately from the document inlet port 55*a* and supplies the hard sheet H toward the first original document conveying passage 52. The straight conveyance passage 56*a* is part of the U-turn conveyance passage 56. The straight conveyance passage 56*a* has a conveying path extending from the document feeding port 72 to the document outlet port 55*b* via the back surface scanning unit 69, and is entirely located on the same plane. According to this configuration, the image forming apparatus 1 can read a small and thick resin card and meet a variety of scanning and reading of the original document sheet S and the hard sheet H.

Next, a description is given of a configuration of control of the image forming apparatus 1 according to an embodiment of this disclosure.

FIG. 9 is a block diagram illustrating a control part of the image forming apparatus 1 according to according to an embodiment of this disclosure. As illustrated in FIG. 9, the image forming apparatus 1 further includes an ADF controller 100, an apparatus controller 111, and the instruction input unit 150. The ADF controller 100 controls operations performed by the ADF 5. The apparatus controller 111 controls operations performed by the devices provided in the housing 1M. The instruction input unit 150 is attached to the apparatus controller 111.

The ADF controller 100 is connected to a document set sensor 82, a correct feed position sensor 92, a document contact sensor 93, a document width sensor 94, a scan entrance sensor 95, a registration sensor 96, a document ejection sensor 97, and a table lift sensor 98, as illustrated in FIG. 9. The ADF controller 100 receives various detection signals from these sensors.

The ADF controller 100 is connected to a pickup motor 101, a document feed motor 102, a scan motor 103, a document ejection motor 104, and a bottom plate lift motor 105.

The pickup motor 101 drives the pickup roller 58. The document feed motor 102 drives the document feed roller 59 and the multiple document conveying rollers 52*b*, 52*c*, and 52*d*.

The scan motor 103 drives a timing pulley that moves a bracket 48 (see FIG. 11) that supports and holds the single unit optical scanning unit 47.

The document ejection motor 104 drives the pair of document output rollers 52*e* and 52*f*.

The bottom plate lift motor 105 lifts a movable original document table 51*a* (see FIG. 4) of the original document tray 51.

The ADF controller 100 issues a timing signal to the single unit optical scanning unit 47 to notify a timing that the leading end of the original document sheet S or the hard sheet H reaches an image scanning position of the single unit optical scanning unit 47. Thereafter, the image data is processed as valid image data. At the same time, the ADF controller 100 issues a timing signal to a second document scanning unit 68 to notify a timing that the leading end of the original document sheet S or the hard sheet H reaches an image scanning position of the back surface scanning unit 69. Similarly, thereafter, the image data is processed as valid image data.

The ADF controller 100 and the apparatus controller 111 are connected via an interface (I/F) circuit 107. As the print key 151 of the instruction input unit 150 is pressed down, a document feeding signal to feed the original document sheet S or a document reading start signal to start reading the image data of the original document sheet S is issued and sent to the ADF controller 100 via the I/F circuit 107.

Figure 10:
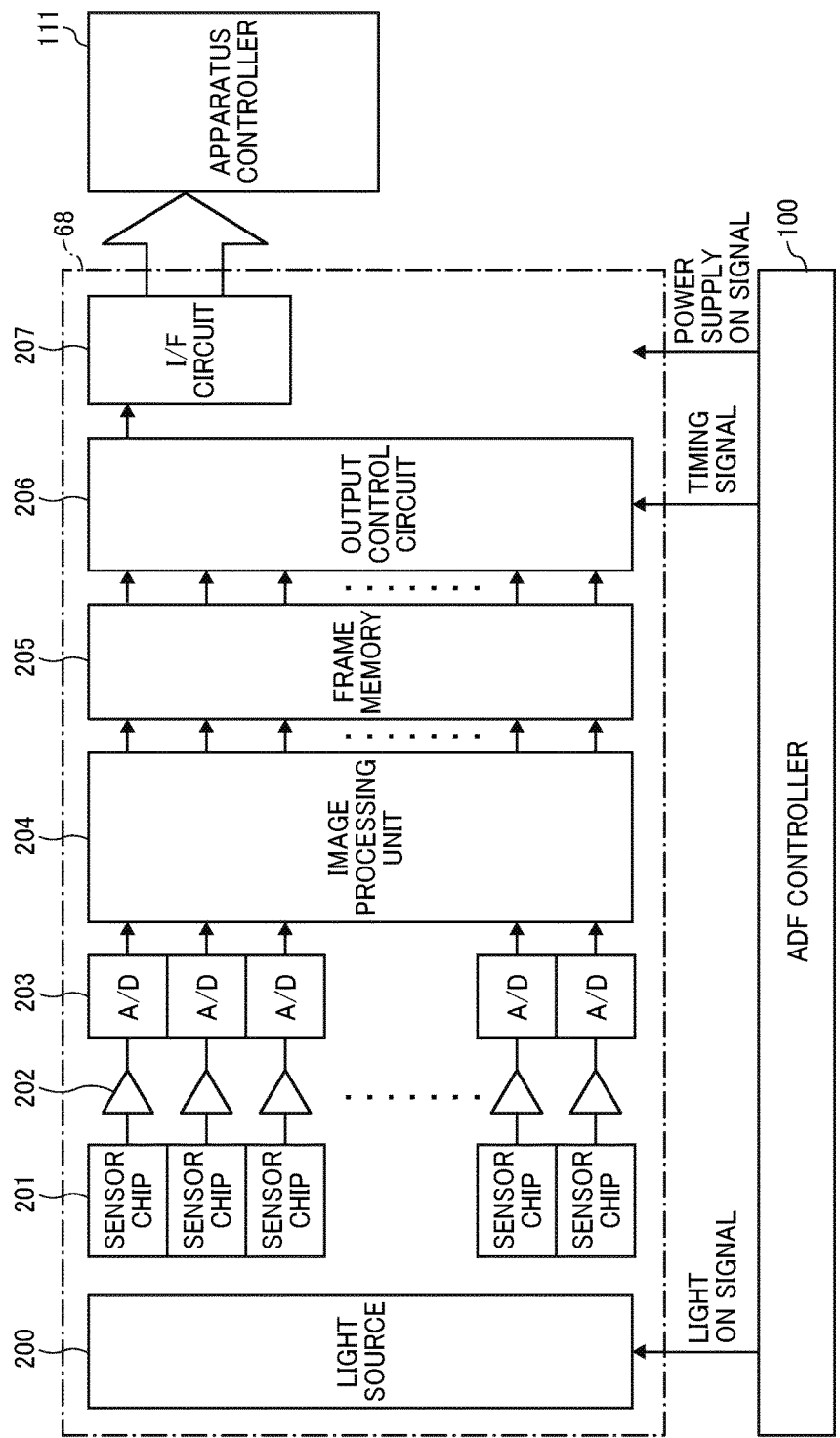
FIG. 10 is a block diagram illustrating a second scanning unit of the image forming apparatus according to an embodiment of this disclosure.

Next, a description is given of a signal path between the image reading device 6 and the image forming apparatus 1 with reference to FIG. 10.

FIG. 10 is a block diagram illustrating the second document scanning unit 68 of the image forming apparatus 1 according to an embodiment of this disclosure.

As illustrated in FIG. 10, the second document scanning unit 68 is provided with a light source 200 that includes a light emitting diode (LED) array, a fluorescent lamp, or a cold cathode tube.

The light source 200 emits light to the original document sheet S based on a light ON signal transmitted from the ADF controller 100.

Further, the second document scanning unit 68 receives the timing signal to notify a timing at which the leading edge of the original document sheet S reaches the image scanning position of the back surface scanning unit 69 and a power supply ON signal of the light source 200 from the ADF controller 100.

The second document scanning unit 68 includes the light source 200, multiple sensor chips 201, multiple operational (OP) amplifier circuits 202, multiple analog-to-digital (A/D) converters 203, an image processing unit 204, a frame memory 205, an output control circuit 206, and an interface (I/F) circuit 207.

The multiple sensor chips 201 are arranged along the main scanning direction of the original document sheet S, which is a width direction of the original document sheet S.

The multiple OP amplifier circuits 202 are individually connected to the multiple sensor chips 201.

The multiple A/D converters 203 are individually connected to the multiple OP amplifier circuits 202.

Each of the multiple sensor chips 201 includes a photoelectric converting element that is called as an equal magnification contact image sensor and a condenser lens. The light reflected on the first surface of the original document sheet S is collected by the condenser lens of each sensor chip 201 to the photoelectric converting element and is read as image data by the multiple sensor chips 201.

The image data read by the respective sensor chips 201 is amplified by the multiple OP amplifier circuits 202, and then is converted to digital image data by the respective A/D converters 203.

The digital image data is inputted to the image processing unit 204, adjusted by shading correction process, and temporarily stored in the frame memory 205. After the output control circuit 206 has converted the digital data into a data format that can be received by the apparatus controller 111, the digital data is output to the apparatus controller 111 via the I/F circuit 207.

Figure 11A:
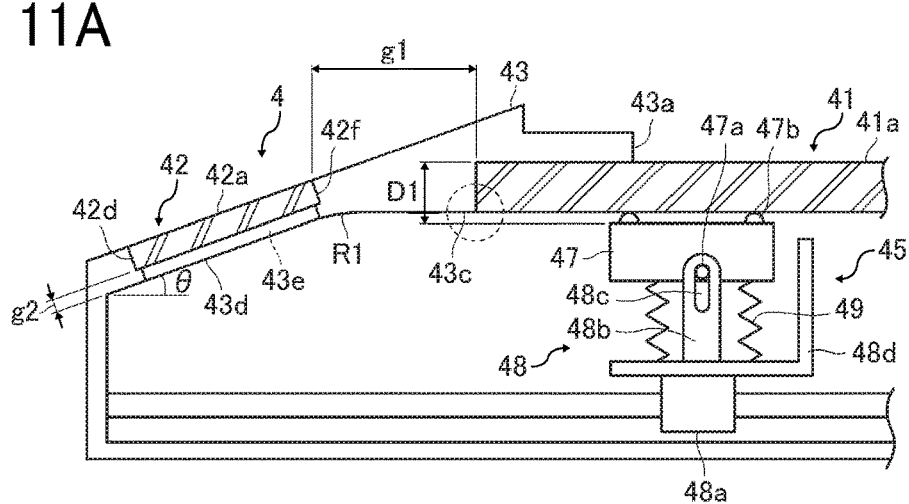
FIGS. 11A, 11B, and 11C are cross sectional front views illustrating a main configuration of an image reading part of the image forming apparatus according to an embodiment of this disclosure.
Figure 11B:
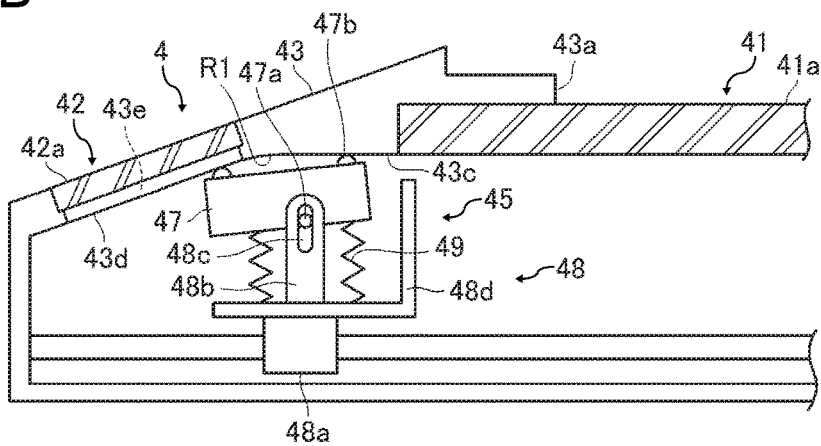
Figure 11C:
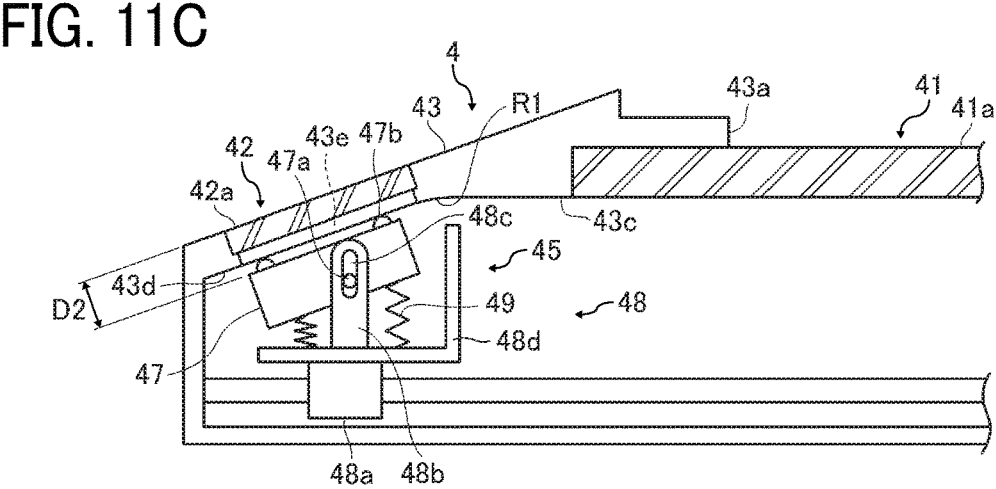

FIGS. 11A, 11B, and 11C are cross sectional front views illustrating a main configuration of the image scanner 4 of the image forming apparatus 1 according to an embodiment of this disclosure, that is, FIGS. 11A, 11B, and 11C illustrate a configuration of the flatbed exposure glass 41 that functions as a first transparent member and the DF exposure glass 42 that functions as a second transparent member disposed to have an inclination relative to the flatbed exposure glass 41. Specifically, FIG. 11A is a schematic longitudinal cross section along a front view direction of the image scanner 4 in the flatbed scanner mode. FIG. 11B is a schematic longitudinal cross section along the front view direction of the image scanner 4 while the single unit optical scanning unit 47 is moving when the mode is switched. FIG. 11C is a schematic longitudinal cross section along the front view direction of the image scanner 4 in the DF scanner mode.

The flatbed exposure glass 41 is designed to face the image formed face of the original document S when the image reading device 6 functions as a flatbed scanner and the original document sheet S to be read is loaded on a document loader face 41a of the flatbed exposure glass 41. The DF exposure glass 42 is designed to face the image formed face of the original document sheet S that passes a predetermined scanning position of the U-turn conveyance passage 56 when the image reading device 6 functions as a DF scanner. Further, as illustrated in FIG. 11A, the DF exposure glass 42 is tilted at a predetermined angle of inclination θ relative to the flatbed exposure glass 41.

The image reading device 6 includes and functions as an image reading device according to the present embodiment of this disclosure.

In the image reading device 6, the image scanner 4 includes a holding member 43 that holds the flatbed exposure glass 41 and the DF exposure glass 42 in a state in which the DF exposure glass 42 is located at an inclined position.

Now, a description is given of the image scanner 4, regarding a detailed configuration of the holding member 43.

As illustrated in FIGS. 11A, 11B, and 11C, in the image scanner 4, the DF exposure glass 42 is disposed separate from the flatbed exposure glass 41 to one side in the sub-scanning direction by predetermined distance and tilted at a predetermined angle of inclination θ relative to the flatbed exposure glass 41. The single unit optical scanning unit 47 functions as an image reading body that reads an image formed on the original document sheet S passing through the U-turn conveyance passage 56 or an image formed on the hard sheet H passing through the straight conveyance passage 56a while moving in the sub-scanning direction along the flatbed exposure glass 41 and the DF exposure glass 42.

In the image scanner 4, the holding member 43 that holds the flatbed exposure glass 41 and the DF exposure glass 42 is provided to close or block a distance g1 between the flatbed exposure glass 41 and the DF exposure glass 42. Hereinafter, the distance g1 is referred to as a gap g1. The holding member 43 includes a flat face 43c and a frame-shaped face 43d formed of resin or metal as a single unit.

To be more specific, the holding member 43 includes the flat face 43c that is adjacently connected with the flatbed exposure glass 41 on a same plane with a face opposite the document loader face 41a onto which the single unit optical scanning unit 47 of the flatbed exposure glass 41 closely contacts, that is, the original document sheet S is loaded.

It is to be noted that the holding member 43 holds each side of the DF exposure glass 42, which are side end portions 42d, 42e, 42f, and 42g (see FIG. 3) on a side of the flat face 43c opposite the position of the flatbed exposure glass 41. The frame-shaped face 43d of the holding member 43 holds the side end portions 42d, 42e, 42f, and 42g. The frame-shaped face 43d projects outwardly toward the single unit optical scanning unit 47 beyond the facing side of the DF exposure glass 42 facing the single unit optical scanning unit 47, and a part close to the flatbed exposure glass 41 is smoothly connected with the flat face 43c.

A curved (round) portion R1 is formed on the frame-shaped face 43d, at a position close to the flatbed exposure glass 41.

The DF exposure glass 42 used in the configuration of the image scanner 4 illustrated in FIGS. 11A, 11B, and 11C is thinner or smaller in thickness than the flatbed exposure glass 41. By contrast, the holding member 43 has the portion including the frame-shaped face 43d having greater in thickness than the DF exposure glass 42.

Further, the holding member 43 holds the DF exposure glass 42 such that the document passing face 42a of the DF exposure glass 42 is on the same plane with the upper face of the holding member 43. Accordingly, the holding member 43 includes an opening 43e that is open from a lower portion of the lower face of the DF exposure glass 42 to the lower face of the frame-shaped face 43d. That is, the holding member 43 holds the side end portions 42d, 42e, 42f, and 42g (see FIG. 3) of the DF exposure glass 42 such that the lower face of the DF exposure glass 42 is located at a position separated by a gap g2 from the lower face of the frame-shaped face 43d of the holding member 43.

It is to be noted that the gap g2 is provided such that an optical distance D1 ranging from the document loader face 41a of the flatbed exposure glass 41 to the single unit optical scanning unit 47 and an optical distance D2 ranging from the document passing face 42a of the DF exposure glass 42 to the single unit optical scanning unit 47 have the same lengths with each other in the configuration of the image scanner 4 illustrated in FIGS. 11A, 11B, and 11C. In other words, the gap g2 is provided to adjust the optical distance D1 and the optical distance D2 to be equal to each other.

Figure 12:
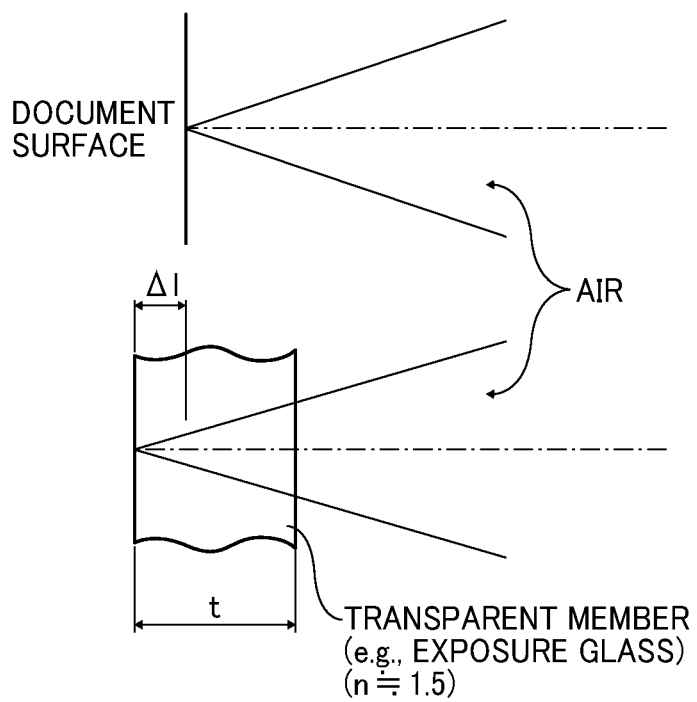
FIG. 12 is a schematic optical path to explain a calculation method of an amount of change of an optical path length when an optical path is intervened by a glass.

A detailed description of setting conditions of the gap g2 is given with reference to FIG. 12.

The single unit optical scanning unit 47 includes at least one upper slider portion 47b. When multiple upper slider portions 47b are employed, the multiple upper slider portions 47b are disposed separated from each other by a distance greater than the length of the opening 43e of the holding member 43 in the main scanning direction. In the present embodiment of this disclosure, as illustrated in FIGS. 11A, 11B, and 11C, four of upper slider portions 47b are formed on the upper face of the single unit optical scanning unit 47. For example, the four upper slider portions 47b are aligned in two rows on both sides in the main scanning direction (a direction perpendicular to the sheet of FIGS. 11A, 11B, and 11C) with two units in a row in the sub-scanning direction.

According to this configuration, the single unit optical scanning unit 47 moves while the upper slider portions 47b aligned in the main scanning direction closely contact the lower face of the flatbed exposure glass 41, as illustrated in FIG. 11A. Then, the single unit optical scanning unit 47 passes the frame-shaped face 43d and the curved portion R1 while the upper slider portions 47b closely contact the lower face of the holding member 43, as illustrated in FIG. 11B. After having passed the curved portion R1, the single unit optical scanning unit 47 moves with the gap g2 relative to the lower face of the DF exposure glass 42 across the same gap as the length of the opening 43e in the frame-shaped face 43d of the holding member 43 while the upper slider portions 47b contact the flat portion of the lower face of the frame-shaped face 43d, as illustrated in FIG. 11C.

Further, in the configuration of the image scanner 4 illustrated in FIGS. 11A, 11B, and 11C, an end face of the holding member 43 on the side of the document loader face 41a of the flatbed exposure glass 41, that is, the contact member 43a of the holding member 43 acts as a reference plane for setting the original document sheet S (i.e., a document setting reference position described below). In the image scanner 4, the original document sheet S is placed such that any one end side of four end sides contacts the contact member 43a on the side of the document loader face 41a of the flatbed exposure glass 41. By so doing, the single unit optical scanning unit 47 can perform a read scanning operation of the original document sheet S, starting from the document setting reference position as a starting point.

It is known that, in a case in which a glass such as the flatbed exposure glass 41 and the DF exposure glass 42 is made relatively thin or with a relatively small size in thickness, a range of the tolerance in thickness of the glass or simply a thickness of the glass decreases (refer to JISR3202). For example, a glass having a thickness t=1.9 has a tolerance in thickness±0.2 and a glass having a thickness t=2.8 has a tolerance in thickness±0.3. Specifically, a thinner glass has a smaller tolerance in thickness and a smaller variation in focus position.

Regarding the formula that expresses an optical distance, it is known that, in a case in which a transparent member such as an exposure glass and a CCD cover is disposed to intersect the optical path, for example, as illustrated in FIG. 12, a refractive index of the transparent member that intervenes the optical path increases, and therefore the optical path length also increases, as expressed by Expression 1 below:

$$\Delta l=[(n-1)/n]*t \quad (1),$$

where "Δl" represents an amount of change of the optical path length, "n" represents a refractive index, and "t" represents a thickness of an object having the refractive index n (e.g., the transparent member).

FIG. 12 is a schematic optical path to explain a calculation method of an amount of change of the optical path length when the optical path is intervened by the transparent member. In FIG. 12, the transparent member is a glass of the same type as the flatbed exposure glass 41 and the DF exposure glass 42 and is assumed to have the refractive index n=1.5.

Further, in the configuration illustrated in FIGS. 11A, 11B, and 11C, it is assumed that the flatbed exposure glass 41 has the thickness and tolerance in thickness of t=2.8±0.3 and the DF exposure glass 42 has the thickness and tolerance in thickness of t=1.9±0.2.

As previously described, when the DF exposure glass 42 is thinner than the flatbed exposure glass 41, the optical path length of the DF exposure glass 42 becomes different from the optical path length of the flatbed exposure glass 41.

In order to address this inconvenience, the present embodiment of this disclosure provides the holding member 43 having the gap g2 between the lower face of the DF exposure glass 42 and the lower face of the frame-shaped face 43d, so that the optical distance D1 is made equal to the optical distance D2.

In the configuration illustrated in FIG. 11, the image scanner 4 includes the first document scanning unit 45 and a guide rod 46 that extends in a horizontal direction, that is, a left-and-right direction in FIG. 2.

The first document scanning unit 45 includes the single unit optical scanning unit 47, the bracket 48, and multiple compression coil springs (elastic members) 49.

The bracket 48 supports the single unit optical scanning unit 47. The multiple compression coil springs 49 are assembled in a compressed state between the single unit optical scanning unit 47 and the bracket 48.

The single unit optical scanning unit 47 functions as a contact image sensor that includes, for example, a mold frame and optical components such as a unity magnification imaging device roof mirror lens array, a light path separation mirror, a unity magnification image sensor, and an illumination light source. The single unit optical scanning unit 47 can perform line scanning of an image with high resolution in the main scanning direction. Further, the single unit optical scanning unit 47 has a large focal depth that can be applied to image reading of book type original documents.

It is to be noted that the single unit optical scanning unit 47 is not limited to a specific configuration but can have any configuration that is applicable to the DF scanner mode and the flatbed scanner mode. It is also to be noted that the main scanning direction indicates a direction parallel to both an upper face of the flatbed exposure glass 41 and the upper face of the DF exposure glass 42.

The bracket 48 includes a lower slider portion 48a, a pair of holder arms 48b, and a bracket body 48d. The lower slider portion 48a is supported by the guide rod 46. The pair of holder arms 48b hold the single unit optical scanning unit 47 at both lateral ends. The lower slider portion 48a and the pair of holder arms 48b are attached to the bracket body 48d as a single unit.

The lower slider portion 48a has a cylindrical body fixed to the lower face of the bracket body 48d at the center in a longitudinal direction of the bracket body 48d. Each of the pair of holder arms 48b is formed by a plate disposed projecting upwardly at the center of the bracket body 48d in FIGS. 11A, 11B, and 11C. End projecting portions 47a project outwardly and vertically from both end faces of the single unit optical scanning unit 47. Both of the pair of holder arms 48b include respective oval openings 48c that axially extend from the single unit optical scanning unit 47 in a direction perpendicular to both axial side faces of the single unit optical scanning unit 47. The respective oval openings 48c support the end projecting portions 47a so that the end projecting portions 47a can rotate about a longitudinal axis and change the position in the vertical direction.

The multiple compression coil springs 49 presses the lower face of the single unit optical scanning unit 47 upwardly at multiple portions in the main scanning direction of the image forming apparatus 1 at a side of the flatbed exposure glass 41 and a side of the DF exposure glass 42.

Further, an upper slider portion 47b is attached to an upper face of the single unit optical scanning unit 47. The upper slider portion 47b has a rectangular ring-shaped body and smoothly slides in the sub-scanning direction while contacting the lower face of at least one of the flatbed exposure glass 41 and the DF exposure glass 42.

It is to be noted that the upper slider portion 47b may be projections that extend in a longitudinal direction or a lateral direction of the single unit optical scanning unit 47 and separate from each other in a direction perpendicular to the longitudinal direction or the lateral direction. It is to be noted that the upper slider portion 47b may include multiple hemispherical projections. In any of the above-described configurations, it is preferable that the upper slider portion 47b includes a material that can smoothly move on the lower face of the flatbed exposure glass 41 and the lower face of the DF exposure glass 42 or other guiding surface with low frictional coefficient without lubrication.

As illustrated in FIGS. 11A, 11B, and 11C, the single unit optical scanning unit 47 is guided to be freely movable in the sub-scanning direction by the guide rod 46 disposed at the lower side of the bracket 48. The single unit optical scanning unit 47 is slidably moves to that the upper part of the single unit optical scanning unit 47 contacts one or both of the flatbed exposure glass 41 and the DF exposure glass 42 according to the position of the single unit optical scanning unit 47 in the sub-scanning direction. Accordingly, the first document scanning unit 45 is regulated in the tilt about the shaft of the guide rod 46 while being freely movable along the guide rod 46.

The first document scanning unit 45 performs line scanning of an image formed on the original document sheet S placed on the flatbed exposure glass 41 and moves in the sub-scanning direction simultaneously. By so doing, the first document scanning unit 45 reads the image formed on the original document sheet S. In addition, the first document scanning unit 45 performs line scanning of the image formed on the original document sheet S passing on the DF exposure glass 42 in the main scanning direction. By so doing, the first document scanning unit 45 reads the image of the original document sheet S.

It is to be noted that the image scanner 4 includes a timing belt having an endless loop inside a housing thereof. The bracket 48 of the first document scanning unit 45 is fixed to a portion on the endless loop of the timing belt in the circumferential direction thereof. Further, the image scanner 4 includes multiple timing pulleys and a motor. The timing belt is wound and stretched around multiple timing pulleys without sagging. The motor drives to rotate one of the multiple timing pulleys.

When reading an image in the flatbed scanner mode, the first document scanning unit 45 moves in the sub-scanning direction toward one side of the flatbed exposure glass 41 (i.e., toward a right side direction in FIG. 2), separating from the home position Pa that is close to a stop position depicted with a broken line in FIG. 2. Then, as the first document scanning unit 45 moves continuously by a minute range (a very small range) in the main scanning direction that is a direction perpendicular to the sub-scanning direction, the single unit optical scanning unit 47 performs line scanning of the image on the original document sheet S to read the image formed on the front face (the lower face) of the original document sheet S placed on the flatbed exposure glass 41. After the line scanning is finished, the first document scanning unit 45 returns to the home position Pa.

When reading an image in the DF scanner mode, the first document scanning unit 45 moves in the sub-scanning direction, from the home position Pa toward a lower side of the DF exposure glass 42, as indicated by a solid line in FIG. 2. That is, the first document scanning unit 45 moves in the sub-scanning direction from the home position Pa toward the opposite side (a left side in FIG. 2) by a predetermined distance, and then stops at the DF scanning position Pb at the lower side of the DF exposure glass 42. Thereafter, the first document scanning unit 45 reads the image formed on the front face of the original document sheet S passing on the DF exposure glass 42.

As described above, the first document scanning unit 45 is movable in the sub-scanning direction so as to be located on the lower side of the flatbed exposure glass 41 and the lower side of the DF exposure glass 42. Further, according to the location of the first document scanning unit 45 in the sub-scanning direction, the single unit optical scanning unit 47 changes the attitude between a first scanning attitude that is a horizontal position to read an image through the whole length of the flatbed exposure glass 41 as illustrated in FIG. 11A and a second scanning attitude that is the inclined position to read an image through the whole length of the DF exposure glass 42 as illustrated in FIG. 11C.

At the time of the attitude change, the single unit optical scanning unit 47 moves between the flatbed exposure glass 41 and the DF exposure glass 42 while the upper slider portion 47b is closely contacting to and sliding on the lower face of the holding member 43.

In the present embodiment of this disclosure, as illustrated in FIGS. 11A, 11B, and 11C, the image scanner 4 includes the holding member 43 having the flat face 43c and the frame-shaped face 43d. The holding member 43 closes the gap g1 between the flatbed exposure glass 41 and the DF exposure glass 42. The holding member 43 is connected to the flatbed exposure glass 41 such that the flat face 43c of the holding member 43 is arranged to be on the same plane as the face of the flatbed exposure glass 41 to which the single unit optical scanning unit 47 closely contacts. The frame-shaped face 43d holds the side end portions 42d, 42e, 42f, and 42g of the DF exposure glass 42, extends downwardly toward the single unit optical scanning unit 47 to be closer to the single unit optical scanning unit 47 than the lower face of the flatbed exposure glass 41 that is disposed facing the single unit optical scanning unit 47, and is smoothly and contiguously connected to the flat face 43c, at a portion near the flatbed exposure glass 41.

According to this configuration, the single unit optical scanning unit 47 moves horizontally while the upper slider portions 47b are in contact with the flatbed exposure glass 41, and then the upper slider portions 47b continuously slides horizontally while contacting the holding member 43. Further, when approaching the curved portion R1, the single unit optical scanning unit 47 moves while smoothly changing the attitude to the inclined position and closely contacting the frame-shaped face 43d of the holding member 43, passes the curved portion R1, and reaches the DF exposure glass 42. Then, the single unit optical scanning unit 47 remains in contact with the flat portion of the lower face of the frame-shaped face 43d, and moves while maintaining the gap g2 with the DF exposure glass 42. The single unit optical scanning unit 47 can move in a reverse direction by taking the reversing steps of the above-described operation.

Here, a description is given of a difference in effects between the holding structure of the flatbed exposure glass 41 and the DF exposure glass 42 according to the present embodiment of this disclosure and the holding structure of the flatbed exposure glass and the DF exposure glass of a comparative image reading device.

It has been generally in the comparative image reading device that the thickness of the flatbed exposure glass and the thickness of the DF exposure glass are equal to each other and a glass holding member holds the flatbed exposure glass and the DF exposure glass such that an entire area where a sliding portion of an image reading body is flat. For these reasons, an angle of the single unit optical scanning unit 47 drastically changes at a boundary of the flatbed exposure glass and the glass holding member and a boundary of the glass holding member and the DF exposure glass, which occasionally resulted in causes of mechanical failure due to noise and impact. Further, when the image reading body moves from the flatbed exposure glass to the glass holding member and from the glass holding member to the DF exposure glass, the sliding portion of the image reading body contacts the step and the edge to result in abrasion.

By contrast, as illustrated in FIGS. 11A, 11B, and 11C, in the image readin device 6 according to the present embodiment of this disclosure, the thickness of the flatbed exposure glass 41 and the thickness of the DF exposure glass 42 are different from each other, and the holding member 43 has the flat face 43c that is contiguous to the flatbed exposure glass 41 so that the flat face 43c of the holding member 43 is on the same plane with the flatbed exposure glass 41 to which the single unit optical scanning unit 47 closely contacts. Further, the holding member 43 also has the frame-shaped face 43d having the curved (round) portion R1 at a portion close to the DF exposure glass 42. According to this configuration, the sliding surface of the upper slider portion 47b of the single unit optical scanning unit 47 sliding below the DF exposure glass 42 is constructed not by the DF exposure glass 42 but by the frame-shaped face 43d of the holding member 43.

Accordingly, when compared with the comparative image reading device that has two portions where burrs and edges are generated due to joints of parts constructing the sliding surface, the image reading device 6 according to the present embodiment of this disclosure has reduced portions where the burrs and edges to one, which corresponds to the flat face 43c. Therefore, impact to the single unit optical scanning unit 47 and wear or abrasion of the upper slider portion 47b can be reduced. Consequently, the noise can be reduced, and therefore the image reading device can be prevented from being broken. Further, the holding member 43 includes the frame-shaped face 43d formed of resin or metal material, and therefore the frame-shaped face 43d can be formed easily. As a result, when compared with a configuration including a curved portion made of glass, the image reading device 6 can expect a reduction in cost.

It is to be noted that, in the present embodiment of this disclosure, the thickness of the DF exposure glass 42 is smaller than the thickness of the flatbed exposure glass 41. This configuration is employed because the length of the DF exposure glass 42 is shorter in the sub-scanning direction than the length of the flatbed exposure glass 41, and therefore the sliding surface of the upper slider portion 47b of the single unit optical scanning unit 47 can be inserted more easily below a lower portion of the DF exposure glass 42 having a smaller thickness.

As described above, in the present embodiment of this disclosure, by reducing the measurement of thickness of the DF exposure glass 42, i.e., a transparent member shorter in the sub-scanning direction, the size of a member (i.e., the frame-shaped face 43d) constructing the sliding surface that is not a transparent member can be reduced, and therefore can make the configuration simpler. Further, by interposing the part of the holding member 43, i.e., the frame-shaped face 43d between the DF exposure glass 42 and the single unit optical scanning unit 47, the sliding surface of the single unit optical scanning unit 47 includes two parts, which are the holding member 43 and the flatbed exposure glass 41, which make a single joint of parts. As a result, occurrence of noise and wear of the sliding surface can be reduced. Further, by providing the frame-shaped face 43d to the lower portion of the DF exposure glass 42, the curved portion R1 is provided to the frame-shaped face 43d while a curved (round) portion is not be formed on a glass surface. According to the configuration in which the frame-shaped face 43d of the holding member 43 has the curved portion R1, when the single unit optical scanning unit 47 is arranged to be smoothly inclined, noise and impact can be reduced, and therefore mechanical failure can also be reduced.

Further, in the present embodiment of this disclosure, the contact member 43a that is the end face of the holding member 43 on the side of the document loader face 41a of the flatbed exposure glass 41 acts as the document setting reference position in the flatbed scanner mode. According to this configuration, the holding member 43 can have multiple functions such as the sliding surface of the single unit optical scanning unit 47, a glass holder, and the document setting reference position (i.e., the document setting reference position). Consequently, the number of parts and the costs can be reduced.

Accordingly, in the configuration according to the present embodiment of this disclosure in which the flatbed exposure glass 41 is different in thickness from the DF exposure glass 42 disposed inclined relative to the flatbed exposure glass 41 and which the holding member 43 that has the flat face 43c and the frame-shaped face 43d with the curved portion R1 holds both the flatbed exposure glass 41 and the DF exposure glass 42, the single unit optical scanning unit 47 can move and smoothly incline between the flatbed exposure glass 41 and the DF exposure glass 42 inclined relative to the flatbed exposure glass 41 with less impact and wear. Therefore, the image reading device 6 and the image forming apparatus 1 can be provided as inexpensive devices with less damage.

The configurations according to the present embodiments of this disclosure are set forth as described above. However, this disclosure is not limited thereto and various modifications and alternations of this disclosure will be apparent to those skilled in the art without departing from the scope and spirit of this disclosure. For example, even though the configuration illustrated in FIGS. 11A, 11B, and 11C includes the DF exposure glass 42 that is thinner than the flatbed exposure glass 41, a configuration that includes the flatbed exposure glass 41 that is thinner than the DF exposure glass 42 can also be applicable to this disclosure. In this case, in order to meet the focal length of the single unit optical scanning unit 47, a gap is provided between the lower face of the flatbed exposure glass 41 and the lower face of the holding member 43 to make the optical distance D1 equal to the optical distance D2.

This disclosure is useful to an image reading device used in an image forming apparatus that corresponds to copier, printer, facsimile machine, printing machine, and multifunctional apparatus including at least two functions of the copier, printer, facsimile machine, and printing machine.

As described above, this disclosure can provide an image reading device and an image forming apparatus including the image reading device, which are inexpensive devices with less damage and in which the reading body is smoothly inclined while moving between the first transparent body and the second transparent body inclined relative to the first transparent body with small impact and wear.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. An image reading device comprising:
   a first transparent body on which an original document is loaded;
   a second transparent body disposed separated from the first transparent body by a desired distance in a sub-scanning direction and configured to incline at a desired angle relative to the first transparent body;
   a holding body configured to hold the first transparent body and the second transparent body; and
   a reading body configured to move in the sub-scanning direction along the first transparent body and the second transparent body,
   the holding body including,
      a flat face configured to close a distance between the first transparent body and the second transparent body and be connected contiguous to the first transparent body on a same plane with a face of the first transparent body to which the reading body contacts, and
      a frame-shaped face configured to hold each of four sides of the second transparent body, and the frame-shaped face projecting toward the reading body beyond a side of the second transparent body which faces the reading body,
      a part of the second transparent body arranged close to the first transparent body, the part of the second transparent body being connected with the flat face, and
   the reading body configured to,
      move while contacting the first transparent body,
      contact the holding body, and
      move with a gap relative to the second transparent body.

2. The image reading device according to claim 1, wherein
   a thickness of the second transparent body is smaller than a thickness of the first transparent body; and
   a first optical distance ranging from a document loader face of the first transparent body to the reading body is equal to a second optical distance ranging from a document passing face of the second transparent body to the reading body.

3. The image reading device according to claim 1, wherein an end face of the holding body in a vicinity of a document loader face of the first transparent body is a reference plane in setting the original document.

4. The image reading device according to claim 1, wherein the image reading device is attached to an image forming device.

5. The image reading device according to claim 1, wherein the reading body includes a plurality of upper slider portions, each of the upper slider portions arranged separate from each other.

6. The image reading device according to claim 1, wherein the holding body is formed from a resin or metal material.

7. The image reading device according to claim 1, wherein a thickness of the first transparent body is not equal to a thickness of the second transparent body.

8. An image forming apparatus comprising:
   an image reading device including,
      a first transparent body on which an original document is loaded,
      a second transparent body disposed separated from the first transparent body by a desired distance in a sub-scanning direction and configured to incline at a desired angle relative to the first transparent body,
      a holding body configured to hold the first transparent body and the second transparent body, and
      a reading body configured to move in the sub-scanning direction along the first transparent body and the second transparent body,
      the holding body including,
         a flat face configured to close a distance between the first transparent body and the second transparent body and be connected contiguous to the first transparent body on a same plane with a face of the first transparent body to which the reading body contacts, and
         a frame-shaped face configured to hold each of four sides of the second transparent body, and the frame-shaped face projecting toward the reading body beyond a side of the second transparent body which faces the reading body,
         a part of the second transparent body arranged close to the first transparent body, the part of the second transparent body being connected with the flat face, and
      the reading body configured to,
         move while contacting the first transparent body,
         contact the holding body, and
         move with a gap relative to the second transparent body; and
   an image forming device configured to form an image based on image data read by the image reading device.

9. The image forming apparatus according to claim 8, wherein
   a thickness of the second transparent body is smaller than a thickness of the first transparent body; and
   a first optical distance ranging from a document loader face of the first transparent body to the reading body is equal to a second optical distance ranging from a document passing face of the second transparent body to the reading body.

10. The image forming apparatus according to claim 8, wherein an end face of the holding body in a vicinity of a document loader face of the first transparent body is a reference plane in setting the original document.

11. The image forming apparatus according to claim 8, wherein the reading body includes a plurality of upper slider portions, each of the upper slider portions arranged separate from each other.

12. The image forming apparatus according to claim 8, wherein the holding body is formed from a resin or metal material.

13. The image forming apparatus according to claim 8, wherein a thickness of the first transparent body is not equal to a thickness of the second transparent body.

* * * * *